United States Patent
Lim et al.

(10) Patent No.: US 10,659,134 B2
(45) Date of Patent: May 19, 2020

(54) APPARATUS AND METHOD FOR PERFORMING BEAMFORMING OPERATION IN WIRELESS COMMUNICATION SYSTEM

(71) Applicant: Samsung Electronics Co., Ltd, Gyeonggi-do (KR)

(72) Inventors: Jong-Bu Lim, Seoul (KR); Byung-Hwan Lee, Gyeonggi-do (KR); Ji-Yun Seol, Gyeonggi-do (KR); Chae-Hee Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/430,162

(22) Filed: Feb. 10, 2017

(65) Prior Publication Data
US 2017/0238294 A1 Aug. 17, 2017

(30) Foreign Application Priority Data
Feb. 12, 2016 (KR) .................. 10-2016-0016501

(51) Int. Cl.
| | | |
|---|---|---|
| *H04B 7/06* | (2006.01) | |
| *H04L 5/00* | (2006.01) | |
| *H04J 11/00* | (2006.01) | |
| *H04B 7/08* | (2006.01) | |
| *H04L 5/14* | (2006.01) | |
| *H04W 16/28* | (2009.01) | |

(52) U.S. Cl.
CPC .......... *H04B 7/0695* (2013.01); *H04B 7/088* (2013.01); *H04J 11/003* (2013.01); *H04L 5/0023* (2013.01); *H04L 5/0037* (2013.01); *H04L 5/0062* (2013.01); *H04L 5/1461* (2013.01); *H04B 7/063* (2013.01); *H04W 16/28* (2013.01)

(58) Field of Classification Search
CPC ... H04L 5/1461; H04L 5/0062; H04L 5/0037; H04L 5/0023; H04B 7/0695; H04B 7/088; H04B 7/063
See application file for complete search history.

(56) References Cited

U.S. PATENT DOCUMENTS

| | | | |
|---|---|---|---|
| 2011/0164668 A1* | 7/2011 | Hoek ................... | H04B 7/0619 375/224 |
| 2013/0329718 A1* | 12/2013 | Liu ...................... | H04B 7/0695 370/338 |
| 2014/0348040 A1 | 11/2014 | Hong et al. | |
| 2017/0033916 A1* | 2/2017 | Stirling-Gallacher ....................... | H04L 5/1438 |

* cited by examiner

*Primary Examiner* — Feben Haile

(57) ABSTRACT

The present disclosure relates to a pre-5th-generation (5G) or 5G communication system to be provided for supporting higher data rates beyond 4th-generation (4G) communication system such as a long term evolution (LTE). A method for performing a beamforming operation in a wireless communication system supporting a full-duplex scheme includes acquiring reference information for allocating a resource, determining a user equipment (UE) combination of a transmission (Tx) UE and a reception (Rx) UE which is capable of sharing a resource from combinations of at least Tx UE and at least one Rx UE, based on the acquired reference information, and allocating a Tx antenna beam for the Tx UE of the UE combination and an Rx antenna beam for the Rx UE of the UE combination.

10 Claims, 26 Drawing Sheets

|                         | UL   | DL   |      |
|-------------------------|------|------|------|
|                         | UE1  | UE2  | UE3  |
| BEST TX/RX BEAM INDEX   | #3   | #1   | #12  |

※ ASSUMPTION: THE LARGER DISTANCE BETWEEN INDEXES IS, THE LARGER TX/RX BEAM ANGLE IS

FIG.25A

|                         | UL   |      | DL   |      |
|-------------------------|------|------|------|------|
|                         | UE1  | UE2  | UE3  | UE4  |
| BEST TX/RX BEAM INDEX   | #6   | #1   | #12  | #10  |

※ ASSUMPTION: THE LARGER DISTANCE BETWEEN INDEXES IS, THE LARGER TX/RX BEAM ANGLE IS

FIG.25B

|  | UE1 | UE2 | UE3 |
|---|---|---|---|
| BEST TX/RX BEAM INDEX | #3 | #12 | #12 |
| RECEIVED POWER | -60dBm | -60dBm | -70dBm |

※ ASSUMPTION: THE LARGER DISTANCE BETWEEN INDEXES IS, THE LARGER TX/RX BEAM ANGLE IS

FIG.25C

|  | UE1 | UE2 | UE3 |
|---|---|---|---|
| BEST TX/RX BEAM INDEX | #3 | #11 | #12 |
| RECEIVED POWER | -60dBm | -60dBm | -70dBm |

※ ASSUMPTION: THE LARGER DISTANCE BETWEEN INDEXES IS, THE LARGER TX/RX BEAM ANGLE IS

FIG.25D

APPARATUS AND METHOD FOR PERFORMING BEAMFORMING OPERATION IN WIRELESS COMMUNICATION SYSTEM

CROSS-REFERENCE TO RELATED APPLICATION(S) AND CLAIM OF PRIORITY

The present application is related to and claims the benefit under 35 U.S.C. § 119(a) of a Korean patent application filed on Feb. 12, 2016 in the Korean Intellectual Property Office and assigned Serial No. 10-2016-0016501, the entire disclosure of which is incorporated herein by reference.

TECHNICAL FIELD

The present disclosure relates to an apparatus and method for performing a beamforming operation in a wireless communication system.

BACKGROUND

To meet the demand for wireless data traffic, which has increased since deployment of 4th-generation (4G) communication systems, efforts have been made to develop an improved 5th-generation (5G) or pre-5G communication system. Therefore, the 5G or pre-5G communication system is also called a 'beyond 4G network' or a 'post long-term evolution (LTE) system'.

It is considered that the 5G communication system will be implemented in millimeter wave (mmWave) bands, e.g., 60 GHz bands, so as to accomplish higher data rates. To reduce propagation loss of radio waves and increase a transmission distance, a beam forming technique, a massive multiple-input multiple-output (MIMO) technique, a full dimensional MIMO (FD-MIMO) technique, an array antenna technique, an analog beam forming technique, and a large scale antenna technique are discussed in 5G communication systems.

In addition, in 5G communication systems, development for system network improvement is under way based on advanced small cells, cloud radio access networks (RANs), ultra-dense networks, a device-to-device (D2D) communication, a wireless backhaul, a moving network, a cooperative communication, coordinated multi-points (CoMP), reception-end interference cancellation, and the like.

In the 5G system, a hybrid frequency shift keying (FSK) and quadrature amplitude modulation (QAM) modulation (FQAM) and a sliding window superposition coding (SWSC) as an advanced coding modulation (ACM) scheme, and a filter bank multi carrier (FBMC) scheme, a non-orthogonal multiple Access (NOMA) scheme, and a sparse code multiple access (SCMA) scheme as an advanced access technology have been developed.

Generally, a wireless communication system may be classified into a frequency division duplexing (FDD) scheme, a time division duplexing (TDD) scheme, and/or the like based on a type of a wireless resource, e.g., a frequency, a time, and/or the like. For example, an LTE scheme may be classified into an FDD LTE scheme and a TDD LTE scheme.

A communication scheme in a wireless communication system may be classified into a half-duplex scheme and a full-duplex scheme.

In the full-duplex scheme, downlink (DL) transmission and uplink (UL) transmission may be performed at the same time using the same wireless resource, e.g., at least one of the same frequency band and the same time interval.

In the half-duplex scheme, only one of DL transmission and UL transmission may be performed using the same wireless resource.

A wireless communication system supporting the half-duplex scheme will be referred to as half-duplex system, and a wireless communication system supporting the full-duplex scheme will be referred to as full-duplex system.

Generally, in a wireless communication system, the higher a transmission frequency is, the more decreased propagation path loss is. Due to this, a propagation range becomes relatively short, so a service area is decreased. A beamforming technology has been proposed as an important technology for mitigating propagation path loss and increasing a propagation range.

For example, a beamforming technology may be classified into a transmission beamforming technology and a reception beamforming technology. The transmission beamforming technology is a technology for concentrating a signal transmitted from each of a plurality of antennas in a transmitting side on a specific direction, and the reception beamforming technology is a technology for concentrating a plurality of antennas in a receiving side on a signal received from a specific direction. In this case, a form including the plurality of antennas will be referred to as antenna array. Antennas included in the antenna array will be referred to as array element antennas.

If the transmission beamforming technology is used, a propagation range of a transmission signal may be increased. Further, the transmission signal is little transmitted toward a direction different from a desired direction for the transmission signal, so interference to other user equipment (UE) may be decreased.

If the reception beamforming technology is used, reception for a propagation may be concentrated ton a specific direction, so sensitivity of a signal received in the specific direction may be increased. Further, a signal received in a direction, not the specific direction is excluded from a received signal, so interference due to the signal received in the direction, not the specific direction may be prevented.

Generally, if a plurality of UEs use the same wireless resource, e.g., the same frequency, the same time, and/or the like in a full-duplex system, interference among the plurality of UEs or interference in each UE may occur. For example, in a case that the same wireless resource is allocated on each of a UL which is permitted for to a Tx UE to use and a DL which is permitted for an Rx UE to use, if the Tx UE is relatively close to the Rx UE, severe inter-user-interference (IUI) may occur. Further, if a BS performs transmission and reception using the same wireless resource, self-interference (SI) may occur.

The IUI denotes interference which occurs according that a signal transmitted from a neighbor UE affects other UE. The SI denotes interference which occurs according that a transmission signal of a UE affects a reception signal of the UE in the UE.

So, there is a need for performing a beamforming operation for decreasing interference in a case that a full-duplex system transmits or receives a signal based on a beamforming technology.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide An aspect of the present disclosure is to address at least the above-mentioned problems and/or disadvantages and to provide at least the advantages described below. Accordingly, an aspect of the present disclosure is to provide an apparatus and method for performing a beamforming operation for decreasing interference due to at least one of IUI and SI in a full-duplex system.

Another aspect of the present disclosure is to provide an apparatus and method for configuring UEs as a UL/DL combination based on IUI and allocating a wireless resource based on the configured UL/UL combination thereby increasing Tx efficiency in a full-duplex system.

Another aspect of the present disclosure is to provide an apparatus and method for configuring UEs as a combination of a Tx UE and an Rx UE based on beamforming indexes which the UEs request to allocate in a full-duplex system.

Another aspect of the present disclosure is to provide an apparatus and method for allocating a wireless resource for a Tx/Rx antenna beam according to beamforming based on interference management in a full-duplex system.

Another aspect of the present disclosure is to provide an apparatus and method for setting a Tx antenna beam and an Rx antenna beam which will share a wireless resource as one combination and allocating a wireless resource thereby one wireless resource is shared in the Tx antenna beam and the Rx antenna beam set as the one combination in a full-duplex system.

In accordance with an aspect of the present disclosure, a method for performing a beamforming operation in a wireless communication system supporting a full-duplex scheme is provided. The method includes acquiring reference information for allocating a resource; determining a combination which is capable of sharing a resource among combinations which is configurable by at least one transmission (Tx) user equipment (UE) and at least one reception (Rx) UE as a UE combination based on the acquired reference information; and allocating a Tx antenna beam and an Rx antenna beam for a Tx UE and an Rx UE included in the UE combination.

In accordance with another aspect of the present disclosure, an operating method of a base station (BS) in a wireless communication system supporting a full-duplex scheme is provided. The operating method includes acquiring reference information for allocating a resource; determining at least one combination to which an antenna beam will be allocated among candidate UE combinations which are configurable by at least one transmission (Tx) user equipment (UE) and at least one reception (Rx) UE based on the acquired reference information; allocating a Tx antenna beam and an Rx antenna beam for a Tx UE and an Rx UE included in the at least one UE combination; transmitting a signal to the Tx UE included in the at least one UE combination based on the allocated Tx antenna beam; and receiving a signal from the Rx UE included in the at least one UE combination based on the allocated Rx antenna beam, wherein the reference information includes Tx antenna beam identification information indicating a Tx antenna beam which is requested by each of the at least one Tx UE and Rx antenna beam identification information indicating an Rx antenna beam which is requested by each of the at least one Rx UE.

In accordance with another aspect of the present disclosure, a base station (BS) in a wireless communication system supporting a full-duplex scheme is provided. The BS includes a controller configured to acquire reference information for allocating a resource, to determine a combination which is capable of sharing a resource among combinations which is configurable by at least one transmission (Tx) user equipment (UE) and at least one reception (Rx) UE as a UE combination based on the acquired reference information, and to allocate a Tx antenna beam and an Rx antenna beam for a Tx UE and an Rx UE included in the UE combination.

In accordance with another aspect of the present disclosure, a base station (BS) in a wireless communication system supporting a full-duplex scheme is provided. The BS includes a processing module configured to acquire reference information for allocating a resource, to determine at least one combination to which an antenna beam will be allocated among candidate user equipment (UE) combinations which are configurable by at least one transmission (Tx) UE and at least one reception (Rx) UE based on the acquired reference information, and to allocate a Tx antenna beam and an Rx antenna beam for a Tx UE and an Rx UE included in the at least one UE combination; and a communication module configured to transmit a signal to the Tx UE included in the at least one UE combination based on the Tx antenna beam allocated by the processing module, and to receive a signal from the Rx UE included in the at least one UE combination based on the Rx antenna beam allocated by the processing module, wherein the reference information includes Tx antenna beam identification information indicating a Tx antenna beam which is requested by each of the at least one Tx UE and Rx antenna beam identification information indicating an Rx antenna beam which is requested by each of the at least one Rx UE.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith, "as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 25A schematically illustrates an example of a process of configuring a UE combination based on an AoA in a wireless communication system according to various embodiments of the present disclosure;

FIG. 25B schematically illustrates another example of a process of configuring a UE combination based on an AoA in a wireless communication system according to various embodiments of the present disclosure;

FIG. 25C schematically illustrates an example of a process of configuring a UE combination based on preferable beam information and DL received signal strength information in a wireless communication system according to various embodiments of the present disclosure; and FIG. 25D schematically illustrates another example of a process of configuring a UE combination based on preferable beam information and DL received signal strength information in a wireless communication system according to various embodiments of the present disclosure.

Throughout the drawings, it should be noted that like reference numbers are used to depict the same or similar elements, features, and structures.

DETAILED DESCRIPTION

Figure 1:
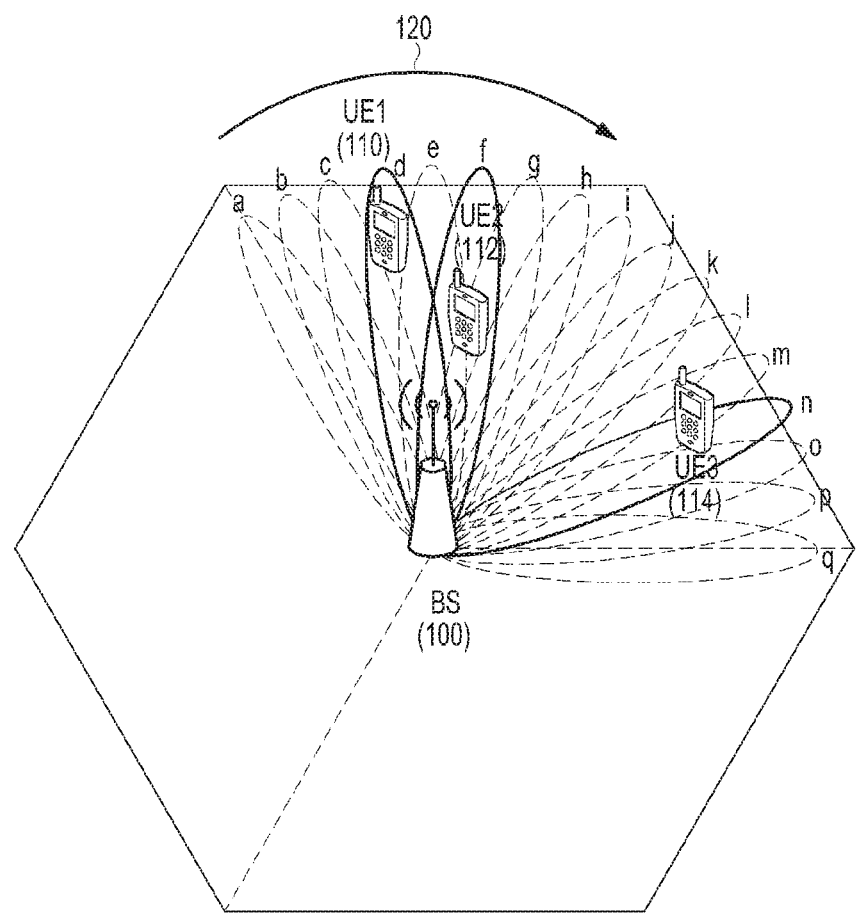
FIG. 1 schematically illustrates an example of a process of performing a DL beamforming operation in a BS in a wireless communication system according to various embodiments of the present disclosure.

FIGS. 1 through 25D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

According to various embodiments of the present disclosure, an electronic device can include communication functionality. For example, an electronic device can be a smart phone, a tablet personal computer (PC), a mobile phone, a video phone, an e-book reader, a desktop PC, a laptop PC, a netbook PC, a personal digital assistant (PDA), a portable multimedia player (PMP), an mp3 player, a mobile medical device, a camera, a wearable device (e.g., a head-mounted device (HMD), electronic clothes, electronic braces, an electronic necklace, an electronic accessory, an electronic tattoo, or a smart watch), and/or the like.

According to various embodiments of the present disclosure, an electronic device can be a smart home appliance with communication functionality. A smart home appliance can be, for example, a television, a digital video disk (DVD) player, an audio, a refrigerator, an air conditioner, a vacuum cleaner, an oven, a microwave oven, a washer, a dryer, an air purifier, a set-top box, a TV box (e.g., Samsung HomeSync™, Apple TV™, or Google TV™), a gaming console, an electronic dictionary, an electronic key, a camcorder, an electronic picture frame, and/or the like.

According to various embodiments of the present disclosure, an electronic device can be a medical device (e.g., magnetic resonance angiography (MRA) device, a magnetic resonance imaging (MRI) device, computed tomography (CT) device, an imaging device, or an ultrasonic device), a navigation device, a global positioning system (GPS) receiver, an event data recorder (EDR), a flight data recorder (FDR), an automotive infotainment device, a naval electronic device (e.g., naval navigation device, gyroscope, or compass), an avionic electronic device, a security device, an industrial or consumer robot, and/or the like.

According to various embodiments of the present disclosure, an electronic device can be furniture, part of a building/structure, an electronic board, electronic signature receiving device, a projector, various measuring devices (e.g., water, electricity, gas or electro-magnetic wave measuring devices), and/or the like that include communication functionality.

According to various embodiments of the present disclosure, an electronic device can be any combination of the foregoing devices. In addition, it will be apparent to one having ordinary skill in the art that an electronic device according to various embodiments of the present disclosure is not limited to the foregoing devices.

According to various embodiments of the present disclosure, a transmitting apparatus or a receiving apparatus can be a user equipment (UE) or a base station (BS).

According to various embodiments of the present disclosure, the term UE can be interchangeable with the term terminal, mobile station (MS), device, subscriber station, and/or the like.

According to various embodiments of the present disclosure, the term BS can be interchangeable with the term enhanced node B (eNB), access point (AP), and/or the like.

According to various embodiments of the present disclosure, the term combination can be interchangeable with the term pair, and/or the like.

An embodiment of present disclosure proposes an apparatus and method for performing a beamforming operation for decreasing interference due to at least one of inter-user-interference (IUI) and self-interference (SI) in a full-duplex system.

An embodiment of present disclosure proposes an apparatus and method for configuring UEs as a uplink (UL)/downlink (DL) combination based on IUI and allocating a wireless resource based on the configured UL/UL combination thereby increasing transmission (Tx) efficiency in a full-duplex system.

An embodiment of present disclosure proposes an apparatus and method for configuring UEs as a combination of a Tx UE and a reception (Rx) UE based on beamforming indexes which the UEs request to allocate in a full-duplex system.

An embodiment of present disclosure proposes an apparatus and method for allocating a wireless resource for a Tx/Rx antenna beam according to beamforming based on interference management in a full-duplex system.

An embodiment of present disclosure proposes an apparatus and method for setting a Tx antenna beam and an Rx antenna beam which will share a wireless resource as one combination and allocating a wireless resource thereby one wireless resource is shared in the Tx antenna beam and the Rx antenna beam set as the one combination in a full-duplex system.

An apparatus and method proposed in various embodiments of the present disclosure can be applied to various communication systems such as a long term evolution (LTE) mobile communication system, an LTE-advanced (LTE-A) mobile communication system, a licensed-assisted access (LAA)-LTE mobile communication system, a high speed downlink packet access (HSDPA) mobile communication system, a high speed uplink packet access (HSDPA) mobile communication system, a high rate packet data (HRPD) mobile communication system proposed in a $3^{rd}$ generation project partnership 2 (3GPP2), a wideband code division multiple access (WCDMA) mobile communication system proposed in the 3GPP2, a code division multiple access (CDMA) mobile communication system proposed in the 3GPP2, an institute of electrical and electronics engineers (IEEE) 802.16m communication system, an IEEE 802.16e communication system, an evolved packet system (EPS), and a mobile internet protocol (Mobile IP) system, a digital video broadcast system such as a mobile broadcast service such as a digital multimedia broadcasting (DMB) service, a digital video broadcasting-handheld (DVP-H), an advanced television systems committee-mobile/handheld (ATSC-M/H) service, and the like, and an internet protocol television (IPTV), a moving picture experts group (MPEG) media transport (MMT) system and/or the like.

Generally, a full-duplex system has provided various schemes for solving IUI. Typical ones are a scheduling scheme which is based on a user combination, e.g., clustering using an angle of arrival (AoA), a scheduling scheme which is based on a neighbor user list per UE, and/or the like.

A scheduling scheme #1, i.e., a scheduling scheme which is based on a user combination using an AoA configures a user set based on an AoA and reference power, and allocates different resources to UEs included in the user set thereby managing IUI.

A scheduling scheme #2, i.e., a scheduling scheme which is based on a neighbor user list of each UE determines a neighbor UE which can interfere each UE and controls the determined neighbor UE to use a different resource, e.g., different time and a different frequency thereby managing IUI.

However, there can be IUI at a boundary of a cluster in the scheduling scheme #1, and the scheduling scheme #2 needs to effectively determine an effective neighbor UE in advance.

Various embodiments to be proposed in the present disclosure can propose to configure a combination of a Tx UE and an Rx UE based on antenna beam indexes collected from neighbor UEs thereby IUI is less than a reference value even though the same resource is allocated.

For example, UEs for which IUI is small can be configured as one UE combination based on beam indexes identifying beams which can be formed according to beamforming. Various embodiments of the present disclosure make UEs included in the UE combination to transmit and receive a signal at the same time using the same wireless resource thereby effectively decreasing IUI effect. This can increase Tx efficiency of a wireless communication system supporting a full-duplex scheme. Various embodiments of the present disclosure configure one UE combination a Tx UE and an Rx UE by considering IUI and SI at the same time, and select a beam index for the Tx UE and the Rx UE included in the UE combination thereby maximizing a performance of a wireless communication system supporting a full-duplex scheme.

Various embodiments to be proposed in the present disclosure will be described with the accompanying drawings.

An example of a process of performing a DL beamforming operation in a BS in a wireless communication system according to various embodiments of the present disclosure will be described with reference to FIG. 1.

FIG. 1 schematically illustrates an example of a process of performing a DL beamforming operation in a BS in a wireless communication system according to various embodiments of the present disclosure.

Referring to FIG. 1, a BS 100 supporting a multi-antenna can perform a DL beamforming operation and a UL beamforming operation. The DL beamforming operation by the BS 100 means an operation of forming a DL Tx beam for transmitting a signal through a DL, and the UL beamforming operation by the BS 100 means an operation of forming a UL Rx beam for receiving a signal through a UL. A UL Rx beam can be formed toward a Tx UE, e.g., a UE which has a signal to be transmitted to a BS, and a DL Tx beam can be formed toward an Rx UE, e.g., a UE to which a BS will transmit a signal. The BS 100 can perform a DL beamforming operation and a UL beamforming operation based on a predetermined beam pattern.

Each of UEs 110, 112, and 114 supporting a multi-antenna can perform a DL beamforming operation and a UL beamforming operation. The DL beamforming operation by each of the UEs 110, 112, and 114 means an operation of forming a DL Rx beam for receiving a signal through a DL and the UL beamforming operation by each of the UEs 110, 112, and 114 means an operation of forming a UL Tx beam for transmitting a signal through a UL. The UL Tx beam can be formed by a UE which has a signal to be transmitted to the BS 100, e.g., a Tx UE among the UEs 110, 112, and 114, and the DL Rx beam can be formed by a UE which will receive a signal from the BS 100, e.g., a Rx UE among the UEs 110, 112, and 114.

For example, the BS 100 can collect DL beam information selected by the UEs 110, 112, and 114 and perform a DL beamforming operation based on the collected DL beam information. The BS 100 can transmit a reference signal (RS) through each DL beam in order for each of the UEs 110, 112, and 114 to select a DL beam. That is, the BS 100 can sequentially select DL Tx beams based on a predetermined order, e.g., a predetermined order 120 from a direction a to a direction g and transmit an RS through the selected DL Tx beam.

The UEs 110, 112, and 114 can sequentially select DL Rx beams and measure signal strength of an RS received through the selected DL Rx beam. The UEs 110, 112, and 114 can select one DL by considering signal strength measured per DL RX beam. The selection of the one DL can include selection of one DL Tx beam and one DL Rx beam. The UEs 110, 112, and 114 can report information related to the selected one DL to the BS 100.

For example, a UE1 110 can report DL beam information indicating a DL Tx beam d to the BS 100, a UE2 112 can report DL beam information indicating a DL Tx beam f to the BS 100, and a UE3 114 can report DL beam information indicating a DL Tx beam n to the BS 100.

Embodiments proposed in the present disclosure will provide various schemes of configuring a beam combination (or UE combination) and configuring a beam pattern based on the configured beam combination (or UE combination) in order for a BS to decrease interference in a network based on reference information. The beam combination can be a combination of one DL Tx beam and one UL Rx beam which can be formed by a BS. The UE combination can be a combination of one Rx UE which will receive a signal from the BS and one Tx UE which will transmit a signal to the BS.

The beam combination and the UE combination can be related each other. For example, the Rx UE configuring the UE combination can be a UE to which the DL Tx beam configuring the beam combination is allocated, and the Tx UE configuring the UE combination can be a UE to which the DL Rx beam configuring the beam combination is allocated. That is, if a beam combination is determined based on the interference in the network, a UE combination can be determined according to the beam combination.

According to an embodiment of the present disclosure, reference information which a BS collects for determining a beam combination (or UE combination) can include preferable beam information, DL received signal strength information, information on a Tx environment, neighbor UE interference information, and/or the like.

The preferable beam information can include information on a DL preferable beam and information on a UL preferable beam.

The information on the DL preferable beam can be fed back from a UE to a BS. The information on the DL preferable beam can include information indicating DL Tx beam and/or DL Rx beam. The DL Tx beam can be selected by the UE among Tx beams which the BS can form for transmitting a signal, and the DL Rx beam can be selected by the UE among Rx beams which the UE can form for receiving a signal.

For example, a UE can select a preferable DL, e.g., one DL which the UE wants to use among a plurality of DLs based on received signal strength of RSs received through the plurality of DLs supporting a multi-input multi-output (MIMO) scheme. The plurality of DLs can be formed by a combination of a plurality of DL Tx beams by a BS and a plurality of DL Rx beams by a UE. The plurality of DL Tx beams can be beams which the BS can form for transmitting a signal based on a smart antenna. The plurality of DL Rx beams can be beams which the UE can form for receiving a signal based on the smart antenna. In this case, in an aspect of one UE, the number of total DLs can be determined by multiplication of the number of total DL Tx beams and the number of total DL Rx beams.

The preferable DL can be defined by a combination of a DL Tx beam and a DL Rx beam forming the preferable DL. The DL Tx beam and the DL Rx beam forming the preferable DL will be referred to as DL preferable Tx beam and DL preferable Rx beam, respectively. In this case, a UE can configure information on a DL preferable beam thereby the information on the DL preferable beam includes identification information indicating a DL preferable Tx beam and/or DL preferable Rx beam. The identification information can be a DL Tx beam index given to each of DL Tx beams and/or a DL Rx beam index given to each of DL Rx beams.

The information on the UL preferable beam can be predicted based on signal strength measured through a UL by a BS, and/or the like. The information on the UL preferable beam can include information indicating a UL Tx beam and/or a UL Rx beam. The BS can select the UL Tx beam from among Tx beams which a UE can form for transmitting a signal, and select the UL Rx beam from among Rx beams which the BS can form for receiving a signal.

For example, a BS can select one preferable UL per Tx UE among a plurality of ULs supporting a MIMO scheme based on received signal strength of RSs received through the plurality of ULs, i.e., UL received signal strength. Here, a RS can be transmitted by a UE which has data to be transmitted through a UL, i.e., a Tx UE. The plurality of ULs can be formed by a plurality of UL Tx beams by a Tx UE and a plurality of UL Rx beams by a BS. The plurality of UL Tx beams can be beams which the UE can form for transmitting a signal based on a smart antenna. The plurality of UL Rx beams can be beams which the BS can form for receiving a signal based on the smart antenna. In this case, in an aspect of one UE, the number of total ULs can be determined by multiplication of the number of total UL Tx beams and the number of total UL Rx beams.

The preferable UL can be defined by a combination of a UL Tx beam and a UL Rx beam forming the preferable UL. The UL Tx beam and the UL Rx beam forming the preferable UL will be referred to as UL preferable Tx beam and UL preferable Rx beam, respectively. In this case, a BS can define information on a UL preferable beam thereby the information on the UL preferable beam includes identification information indicating a UL preferable Tx beam and/or UL preferable Rx beam. The identification information can be a UL Tx beam index given to each of UL Tx beams and/or a UL Rx beam index given to each of UL Rx beams.

The DL received signal strength information can be information on received power measured for a signal received through a DL. The UE can configure DL received signal strength information based on measured received power and report the DL received signal strength information to a BS.

The information on the Tx environment can be information defining a characteristic of a path through which a BS transmits a signal to an Rx UE and a characteristic of a path through which a Tx UE transmits a signal to the BS. For example, the information on the Tx environment can include information classifying a line-of-sight (LoS), a non-line-of-sight (NLoS), and/or the like on a UL and a DL.

Table 1 expresses an example of information on a Tx environment including information classifying an LoS, an NLoS, and/or the like on a UL and a DL.

TABLE 1

| UL | DL |
|---|---|
| NLoS | LoS |
| LoS | NLoS |
| NLoS | NLoS |

The BS can estimate a vector value indicating an LoS component on a UL or DL based on a UL Tx beam index or DL Rx beam index of a UE located at an NLoS environment. The BS can determine whether there is the UE located at the NLoS environment using the estimated vector value.

The neighbor UE interference information can be information defining interference strength due to a signal transmitted by at least one neighbor UE in an Rx UE. The Rx UE can feed back the neighbor UE interference information to the BS. The BS can consider the neighbor UE interference information fed back from the Rx UE for configuring a UE combination determining a beam pattern to be used for beamforming.

An example of an inner structure of a BS in a wireless communication system according to various embodiments of the present disclosure will be described with reference to FIG. 2.

Figure 2:
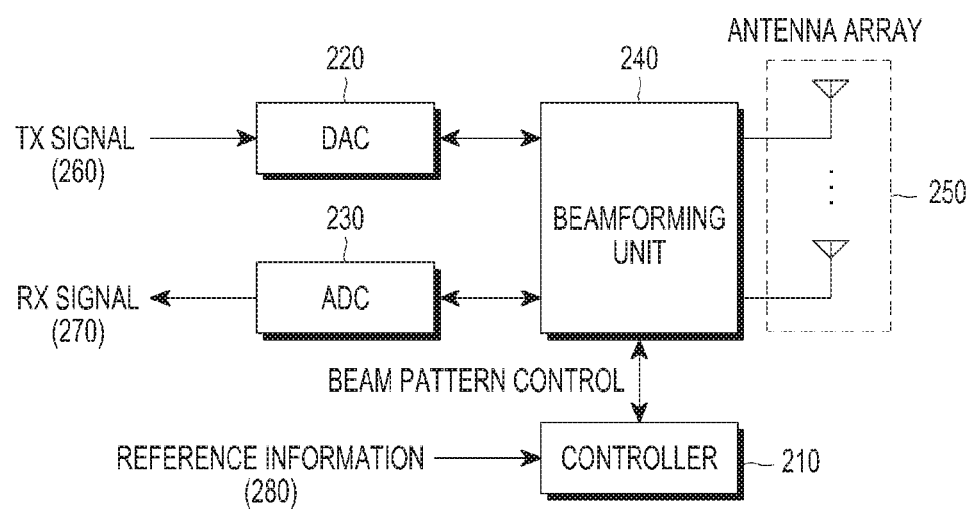
FIG. 2 schematically illustrates an example of an inner structure of a BS in a wireless communication system according to various embodiments of the present disclosure.

FIG. 2 schematically illustrates an example of an inner structure of a BS in a wireless communication system according to various embodiments of the present disclosure.

Referring to FIG. 2, a BS can include a controller 210, a digital-analog convertor (DAC) 220, an analog-digital convertor (ADC) 230, a beamforming unit 240, an antenna array 250, and/or the like.

The DAC 220 receives a digital type-Tx signal 260 and converts the received Tx signal 260 into an analog type-Tx signal. The digital type-Tx signal 260 can be an RS or a data signal. An inverse fast Fourier transform (IFFT) and parallel to serial (P/S) conversion can be performed on the Tx signal 260 before the DAC 220 receives the Tx signal 260. The analog type-Tx signal converted by the DAC 220 can be provided to the beamforming unit 240.

The ADC 230 converts an analog type-received signal output from the beamforming unit 240 into a digital type-received signal 270. The received signal 270 can be an RS or a data signal. A serial to parallel (S/P) conversion and fast Fourier transform (FFT) can be performed on the received signal output from the ADC 230.

The beamforming unit 240 can allocate a beam for each of areas which are generated by dividing one cell based on a preset beam width by controlling radiation directions of a plurality of antennas included in the antenna array 250.

For example, the beamforming unit 240 can perform a UL beamforming operation and a DL beamforming operation based on a predetermined beam pattern. For this, the beamforming unit 240 can provide a beam pattern to the antenna array 250.

The beamforming unit 240 sequentially forms total DL Tx beams based on a predetermined order to perform a sweeping operation in which an RS is transmitted through the formed DL Tx beam. The beamforming unit 240 can identify one DL Tx beam and one UL Rx beam configuring each of a plurality of beam combinations (or UE combinations) based on beam pattern control information provided from the controller 210.

The beamforming unit 240 can form the identified one DL Tx beam and one UL Rx beam at the same time by controlling the antenna array 250. The one DL Tx beam can be formed for an Rx UE included in a UE combination which corresponds to the beam combination and the one UL Rx beam can be formed for a Tx UE included in the UE combination which corresponds to the beam combination.

The beamforming unit 240 can transmit a signal to the Rx UE through the formed one DL Tx beam, and receive a signal from the Tx UE through the formed one UL Rx beam. The beamforming unit 240 can use the same wireless resource on one DL Tx beam and one UL Rx beam configuring one beam combination. That is, the beamforming unit 240 can allocate the same wireless resource for an Rx UE and a Tx UE configuring one UE combination. This can be possible by sufficiently considering interference which can occur in a network due to use of the same wireless resource upon determining a beam combination. The beamforming unit 240 can allocate a different wireless resource per UE combination. This is for preventing interference which can occur between UEs configuring a different UE combination.

The antenna array 250 can transmit an orthogonal frequency division multiplexing (OFDM) frame which is generated by a data signal and an RS based on the beam pattern provided from the beamforming unit 240 or receive an OFDM frame transmitted from UEs.

The controller 210 can generate beam pattern control information to be provided to the beamforming unit 240 based on collected reference information 280. For example, the reference information 280 can include preferable beam information, DL received signal strength, information on a Tx environment, neighbor interference information, and/or the like. The beam pattern control information can include a beam pattern generated based on UE combinations which are configured by considering the reference information 280. The UE combination can be configured by an Rx UE to which a DL Tx beam will be allocated and a Tx UE to which a UL Rx beam will be allocated. The controller 210 can allow an Rx UE and a Tx UE configuring a UE combination to use the same wireless resource. However, the controller 210 needs to control a Tx UE or an Rx UE configuring another UE combination to use a different wireless resource.

According to an embodiment of the present disclosure, the controller 210 can determine a beam pattern based on preferable beam information. That is, the controller 210 can configure UE combinations (beam combinations) based on the preferable beam information and configure a beam pattern based on the configured UE combinations (beam combinations).

The controller 210 can configure UE combinations based on a DL preferable beam index fed back from UEs and a UL preferable beam index determined by the controller 210. The controller 210 can estimate information on a UL preferable beam based on UL received signal strength. The estimated information on the UL preferable beam can include an index indicating a UL Tx beam which can be formed by a UE (UL Tx beam index) and an index indicating a UL Rx beam which can be formed by a BS (UL Rx beam index).

For example, the controller 210 can predict AoAs which are formed by DL preferable Tx beams and UL preferable Rx beams based on preferable beam information, and configure UE combinations based on the predicted AoAs.

In an embodiment of the present disclosure, it will be assumed that a BS transmits and receives a signal based on a full-duplex scheme, and a UE transmits or receives a signal based on a half-duplex scheme.

The controller 210 can identify DL preferable Tx beams (DL preferable Tx beam indexes) which each of at least one Rx UE requests to use based on information on DL preferable beams fed back from UEs. The controller 210 can set UL preferable Rx beams (UL preferable Rx beam indexes) which can be allocated for each of at least one Tx UE based on information on a UL preferable beam estimated which is based on UL received signal strength.

The controller 210 can predict an AoA θ per beam combination by DL preferable Tx beams and UL preferable Rx beams. Here, a beam combination can correspond to a UE combination. The AoA can be an included angle formed by one DL preferable Tx beam and one UL preferable Rx beam. In this case, the number of UE combinations configurable by one DL preferable Tx beam index can be determined based on the number of UL preferable Rx beams, and the number of UE combinations configurable by one UL Rx beam index can be determined based on the number of DL preferable Tx beam indexes.

For example, in a case that the number of DL preferable Tx beams is 3 and the number of UL preferable Rx beams is 3, the number of candidate UE combinations of which AoAs will be predicted can be 9. The controller 210 can predict an AoA for each of the nine candidate UE combinations. The AoA can be predicted by a DL preferable Tx beam and a UL preferable Rx beam configuring a candidate UE combination.

The controller 210 can divide the nine candidate UE combinations by 3 based on a DL preferable Tx beam and a UL preferable Rx beam, and select an AoA which is maximum among AoAs predicted for the three UE combinations.

An example of a process of configuring a UE combination based on an AoA in a wireless communication system according to various embodiments of the present disclosure will be described with reference to FIG. 25A.

FIG. 25A schematically illustrates an example of a process of configuring a UE combination based on an AoA in a wireless communication system according to various embodiments of the present disclosure.

Referring to FIG. 25A, it will be assumed that a UE1 is a Tx UE, and a UE2 and a UE3 are Rx UEs. It will be assumed that a UL preferable Rx beam index of the UE1 is '#3', a DL preferable Tx beam index of the UE2 is '#1', and a DL preferable Tx beam index of the UE3 is '#12'.

At this time, in a case that it will be assumed that the greater a difference between the beam indexes is, the greater an AoA between two beams is, a BS can configure a UE1 which is a Tx UE and a UE3 which is an Rx UE as one UE combination.

The controller 210 can select an AoA satisfying a preset threshold value from among AoAs predicted for divided UE combinations. In this case, a plurality of AoAs can be selected. So, the controller 210 needs to provide a scheme of selecting one of the selected AoAs.

An example of a process of configuring a UE combination based on an AoA in a wireless communication system according to various embodiments of the present disclosure has been described with reference to FIG. 25A, and another example of a process of configuring a UE combination based on an AoA in a wireless communication system according to various embodiments of the present disclosure will be described with reference to FIG. 25B.

FIG. 25B schematically illustrates another example of a process of configuring a UE combination based on an AoA in a wireless communication system according to various embodiments of the present disclosure.

Referring to FIG. 25B, it will be assumed that a UE1 and a UE2 are Tx UEs, and a UE3 and a UE4 are Rx UEs. It will be assumed that a UL preferable Rx beam index of the UE1 is '#6', a UL preferable Rx beam index of the UE2 is '#1', a DL preferable Tx beam index of the UE3 is '#12', and a DL preferable Tx beam index of the UE4 is '#10'.

At this time, in a case that it will be assumed that the greater a difference between the beam indexes is, the greater an AoA between two beams is, and a preset threshold value is 5, a BS can configure a UE1 which is a Tx UE and a UE3 which is an Rx UE as one UE combination and configure a UE2 which is a Tx UE and a UE4 which is an Rx UE as one UE combination.

According to an embodiment of the present disclosure, the controller 210 can determine a beam pattern based on preferable beam information and DL received signal strength information. That is, the controller 210 can configure UE combinations (beam combinations) based on the preferable beam information and the DL received signal strength information, and configure a beam pattern based on the configured UE combinations (beam combinations). The DL received signal strength information means information defining strength of a signal which a UE receives from the BS. The DL received signal strength information can be reported from the UE to the BS.

The controller 210 can assume a case that there are a plurality of candidate UE combinations of which AoAs are similar among UE combinations which correspond to one DL Tx beam or one UL Rx beam based on preferable beam information. In this case, the controller 210 can select one UE combination based on DL received signal strength information of UEs (Tx UE and/or Rx UE) included in the plurality of candidate UE combinations. For example, the controller 210 can select a UE combination in which a difference between DL received signal strength of a Tx UE and DL received signal strength of an Rx UE is maximum. So, the controller 210 can determine a UE combination by considering location of a UE which is more accurately predicted compared to a case that only preferable beam information is considered by using DL received signal strength information. The controller 210 can additionally consider a modulation scheme (modulation level) as well as DL received signal strength information for determining a UE combination.

Another example of a process of configuring a UE combination based on an AoA in a wireless communication system according to various embodiments of the present disclosure has been described with reference to FIG. 25B, and an example of a process of configuring a UE combination based on preferable beam information and DL received signal strength information in a wireless communication system according to various embodiments of the present disclosure will be described with reference to FIG. 25C.

FIG. 25C schematically illustrates an example of a process of configuring a UE combination based on preferable beam information and DL received signal strength information in a wireless communication system according to various embodiments of the present disclosure.

Referring to FIG. 25C, it will be assumed that a UE1 is a Tx UE, and a UE2 and a UE3 are Rx UEs. It will be assumed that a UL preferable Rx beam index of the UE1 is '#3', a DL preferable Tx beam index of the UE2 is '#12', and a DL preferable Tx beam index of the UE3 is '#12'.

At this time, in a case that the greater a difference between the beam indexes is, the greater an AoA between two beams is, it is predicted that AoAs of the UE1 as the Tx UE and the UE2 and UE3 as the Rx UEs are the same, so a BS needs to select one of the UE2 and UE3 for configuring a UE combination.

In this case, one of the UE2 and UE3 can be selected based on received signal strength of the UE1, UE2, and UE3. For example, one of the UE2 and UE3 as the Rx UEs can be selected. A difference between received signal strength −60 dBm of the UE1 as the Tx UE and received signal strength of the selected UE is greater than a difference between received signal strength of the UE1 and received signal strength of a UE which is not selected. As shown in FIG. 25C, a received signal strength of the UE2 is −60 dBm, a received signal strength of the UE3 is −70 dBm, so the UE3 and the UE1 can be configured as one UE combination.

An example of a process of configuring a UE combination based on preferable beam information and DL received signal strength information in a wireless communication system according to various embodiments of the present disclosure has been be described with reference to FIG. 25C, and another example of a process of configuring a UE combination based on preferable beam information and DL received signal strength information in a wireless communication system according to various embodiments of the present disclosure will be described with reference to FIG. 25D.

FIG. 25D schematically illustrates another example of a process of configuring a UE combination based on preferable beam information and DL received signal strength information in a wireless communication system according to various embodiments of the present disclosure.

Referring to FIG. 25D, it will be assumed that two Rx UEs can be classified as UE combinations with a similar AoA if beam indexes of the two Rx UEs are not the same and the beam indexes of the two Rx UEs are within a preset range. That is, as shown in FIG. 25D, it will be understood that UEs of which AoAs are not the same can be one UE combination based on received signal strength.

According to an embodiment of the present disclosure, a controller 210 can determine whether there is an NLoS type-UE based on preferable beam information, and can differently apply a scheme of configuring a UE combination based on the determined result. For example, if there is no NLoS type-UE, the controller 210 can configure UE combinations using an AoA which is predicted based on the preferable beam information. If there is the NLoS type-UE, the controller 210 can estimate an LoS component vector based on Tx beam indexes and Rx beam indexes in a BS, and configure a UE combination based on the estimated LoS component vector and the preferable beam information thereby an angle for each of LoSs of a Tx UE and an Rx UE is greater than or equal to a preset threshold value.

According to an embodiment of the present disclosure, the controller 210 can select a UE combination including a Tx UE and an Rx UE among UE combinations which are configurable based on the preferable beam information by considering IUI and SI thereby a system performance is maximized. The controller 210 can configure a table defining SI strength in advance for considering the SI.

For example, the controller 210 can select candidate UE combinations of which AoAs are greater than or equal to a preset threshold value based on the preferable beam information, and determine a final UE combination as one candidate UE combination of which SI is expected as the smallest among the selected candidate UE combinations. The controller 210 can select candidate UE combinations by considering DL received signal strength information as well as the preferable beam information, and determine a final UE combination as one candidate UE combination of which SI is expected as the smallest among the selected candidate UE combinations. The controller 210 can generate a beam pattern based on the final UE combination (beam combination).

According to an embodiment of the present disclosure, the controller 210 can classify UEs based on neighbor interference information, and configure a UE combination according to a scheme which is different for each of the classified UEs.

For example, the controller 210 can collect neighbor interference information received from Rx UEs and classify UEs by considering the collected neighbor interference information. The UEs can be classified into UEs to which neighbor interference exists or UEs to which neighbor interference does not exist, or can be classified into NLoS type-UEs or LoS type-UEs.

In a case that the UEs are classified into the UEs to which the neighbor interference exists and the UEs to which the neighbor interference does not exist, the controller 210 can configure the UEs to which the neighbor interference exists as UE combinations based on the preferable beam information. However, the controller 210 can randomly configure a UE combination for the UEs to which the neighbor interference does not exist.

In a case that the UEs are classified into the NLoS type-UEs or the LoS type-UEs, the controller 210 can configure the UEs classified as the NLoS type-UEs and a UE to which neighbor interference does not exist as a UE combination. However, the controller 210 can determine whether there is neighbor interference for the LoS type-UEs, and configure LoS type-UEs to which the neighbor interference exists as UE combinations based on the preferable beam information. However, the controller 210 can randomly configure a UE combination for LoS type-UEs to which the neighbor interference does not exist.

In a case that a UE combination is configured according to various embodiments of the present disclosure, each DL preferable Tx beam and each UL preferable Rx beam can be used for only one UE combination. That is, each DL preferable Tx beam and each UL preferable Rx beam can not be included in a plurality of UE combinations.

The controller 210 can configure a beam pattern based on the determined UE combination. The controller 210 can allocate the same wireless resource to a Tx UE and an Rx UE configuring one UE combination and allocate a different wireless resource to a different UE combination.

While the controller 210, the DAC 220, the ADC 230, and the beamforming unit 240, and the antenna array 250 are described in the BS as separate units, it is to be understood that this is merely for convenience of description. In other words, the controller 210, the DAC 220, the ADC 230, and the beamforming unit 240, and the antenna array 250 can be incorporated into a single unit.

The BS can be implemented with at least one processor.

An example of an inner structure of a BS in a wireless communication system according to various embodiments of the present disclosure has been described with reference to FIG. 2, and an example of a process of transmitting/receiving data based on a beamforming operation in a BS in a wireless communication system according to various embodiments of the present disclosure will be described with reference to FIG. 3.

Figure 3:
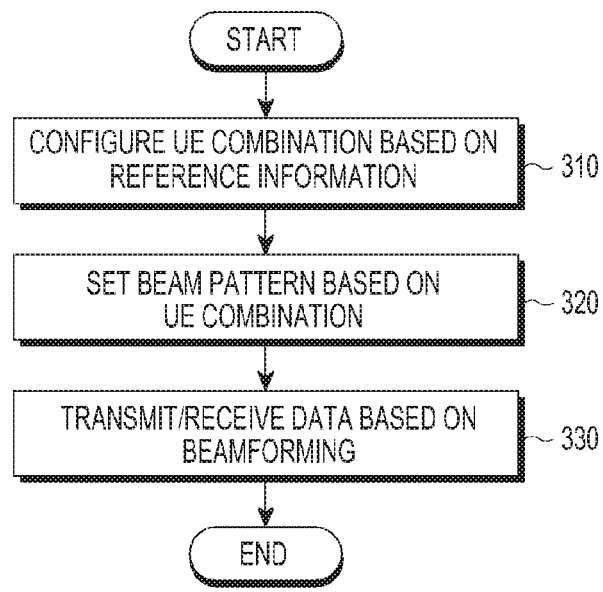
FIG. 3 schematically illustrates an example of a process of transmitting/receiving data based on a beamforming operation in a BS in a wireless communication system according to various embodiments of the present disclosure.

FIG. 3 schematically illustrates an example of a process of transmitting/receiving data based on a beamforming operation in a BS in a wireless communication system according to various embodiments of the present disclosure.

Referring to FIG. 3, a BS can configure a UE combination based on reference information at operation 310. The reference information can be defined by information which a BS will consider for allocating a wireless resource for a UL/DL by considering interference. The BS can receive reference information from UEs or directly generate the reference information.

The reference information can include information with which a BS can predict a location of a UE. The location of the UE can be predicted based on a direction and a distance. For example, the direction can be predicted using preferable beam information per UE, and the distance can be predicted using DL received signal strength information provided by a UE.

For example, the BS can select one Tx UE and one Rx UE which can minimize effect due to interference even though the same resource is allocated to the one Tx UE and the one Rx UE using collected reference information, and configure a UE combination including the selected one Tx UE and the selected one Rx UE. At this time, it will be preferable that the BS configures UE combinations as many as possible by considering reference information. The BS can allocate a UL Rx beam to a Tx UE configuring a UE combination and allocate a DL Tx beam to an Rx UE configuring the UE combination. For example, the BS can allocate a UL preferable Rx beam which corresponds to the Tx UE and allocate a DL preferable Tx beam which corresponds to the Rx UE. The UL preferable Rx beam can be determined by considering received signal strength measured by the BS for the Tx UE. The DL preferable Tx beam can be a DL Tx beam which the Rx UE requests to allocate.

The BS can configure one beam combination by a UL Rx beam and a DL Tx beam allocated to the Tx UE and the Rx UE configuring the UE combination. The BS can allocate the same wireless resource for the UL Rx beam and the DL Tx beam configuring the one beam combination. As described above, a UE combination is configured for minimizing effect due to interference such as IUI, SI, and/or the like, so it is possible to allocate the same wireless resource. For the minimizing effect due to interference, there is a need for configuring a UE combination including a Tx UE and an Rx UE which are sufficiently far each other.

According to an embodiment of the present disclosure, the BS can predict an AoA between one DL preferable Tx beam and each of a plurality of UL preferable Rx beams or predict an AoA between one UL preferable Rx beam and each of a plurality of DL preferable Tx beams.

Table 2 shows an example in which a BS predicts AoAs for 3 Tx UEs based on 3 Rx UEs. The example in Table 2 shows a case that the BS predicts an AoA between one DL preferable Tx beam and each of UL preferable Rx beams.

TABLE 2

| Classification 1 (i)<br>(Rx UE/DL preferable Tx beam) | Classification 2 (j)<br>(Tx UE/UL preferable Rx beam) | AoA<br>($\theta_{ij}$) |
|---|---|---|
| #1 | #1 | $\theta_{11}$ |
|  | #2 | $\theta_{12}$ |
|  | #3 | $\theta_{13}$ |
| #2 | #1 | $\theta_{21}$ |
|  | #2 | $\theta_{22}$ |
|  | #3 | $\theta_{23}$ |
| #3 | #1 | $\theta_{31}$ |
|  | #2 | $\theta_{32}$ |
|  | #3 | $\theta_{33}$ |

Here, classification 1 (i) denotes an index for classifying an Rx UE or a DL preferable Tx beam, and classification 2 (j) denotes an index for classifying an Tx UE or a UL preferable Rx beam.

Referring to Table 2, a BS predicts AoAs $\theta_{11}$, $\theta_{12}$, and $\theta_{13}$ between a DL preferable Tx beam 1 (TX #1) and each of 3 UL preferable Rx beams 1, 2, and 3 (RX #1, RX #2, and RX #3), predicts AoAs $\theta_{21}$, $\theta_{22}$, and $\theta_{23}$ between a DL preferable Tx beam 2 (TX #2) and each of the RX #1, RX #2, and RX #3, and predicts AoAs $\theta_{31}$, $\theta_{32}$, and $\theta_{33}$ between a DL preferable Tx beam 3 (TX #3) and each of the RX #1, RX #2, and RX #3.

Unlike Table 2, the BS can predict AoAs between each UL preferable Rx beam and each of 3 DL preferable Tx beams. Finally, AoAs $\theta_{ji}$ predicted based on the UL preferable Rx beam will be equal to AoAs $\theta_{ij}$ predicted based on the DL preferable Tx beam except that orders thereof are varied.

The BS can select one of AoAs $\theta_{ij}$ which are predicted based on one DL preferable Tx beam or one of AoAs $\theta_{ji}$ which are predicted based on one UL preferable Rx beam. The BS can determine the one DL preferable Tx beam and the one UL preferable Rx beam as one beam combination. The BS can configure a beam pattern for beamforming based on finally determined beam combinations.

For example, the BS can select one of AoAs which are predicted based on one DL preferable Tx beam or one UL preferable Rx beam, and the selected AoA is the largest among the predicted AoAs. The reason why the largest AoA is selected that a distance between an Rx UE and a Tx UE can be predicted based on an AoA. That is, it will be predicted that the larger an AoA is, the longer a distance between an Rx UE and a Tx UE is. It will be sufficiently predicted that the longer the distance between the Rx UE and the Tx UE is, the more decreased interference, e.g., IUI which can occur in a network is.

The BS can determine one beam combination based on one DL preferable Tx beam and one UL preferable Rx beam for which an AoA with the largest angle is predicted.

For example, if AoAs $\theta_{11}$, $\theta_{12}$, and $\theta_{13}$ for three UL preferable Rx beams RX #1, RX #2, and RX #3 are predicted as $\theta_{13} > \theta_{12} > \theta_{11}$ based on TX #1, the controller 210 can determine the TX #1 and the RX #3 for which the largest AoA is predicted as one beam combination.

For example, if AoAs $\theta_{21}$, $\theta_{22}$, and $\theta_{23}$ for three UL preferable Rx beams RX #1, RX #2, and RX #3 are predicted as $\theta_{22} > \theta_{21} > \theta_{23}$ based on TX #2, the controller 210 can determine the TX #2 and the RX #2 for which the largest AoA is predicted as one beam combination.

For example, if AoAs $\theta_{31}$, $\theta_{32}$, and $\theta_{33}$ for three UL preferable Rx beams RX #1, RX #2, and RX #3 are predicted as $_{32} > \theta_{31} > \theta_{33}$ based on TX #3, the controller 210 can determine the TX #3 and the RX #2 for which the largest AoA is predicted as one beam combination. However, the RX #2 has been determined to be configured as one beam combination with the TX #2, so the BS can determine the TX #3 and the RX #1 for which the next largest AoA is predicted as one beam combination.

The example as described above is a scheduling example in a case that it will be assumed that a beam combination is determined based on an order of DL preferable Tx beams. If a criterion for scheduling is changed, the result can be changed.

For example, the BS can preset a threshold value, and select one of AoAs which are predicted based one DL preferable Tx beam or one UL preferable Rx beam using the preset threshold value. The threshold value can be preset by considering interference which can occur in a network. In this case, interference due to a UE combination which can be determined based on the selected AoA can be managed based on the threshold value.

For example, the BS can determine whether there is at least one AoA satisfying a preset threshold value among AoAs which are predicted based on one DL preferable Tx beam. The satisfaction of the preset threshold value means satisfaction of a criterion that the AoA is greater than or equal to the threshold value.

If there is at least one AoA satisfying the criterion according to the preset threshold value, the BS can select one of the AoAs. If the number of the at least one AoA is 1, the BS can easily select the one AoA. However, if the number of the at least one AoA is greater than or equal to 2, the BS needs to provide a scheme of selecting one of the AoAs. For example, the BS can select one AoA which is the largest among AoAs which are greater than or equal to the preset threshold value or can select one AoA by considering a priority, and/or the like given to a Tx UE or an Rx UE. That is, if AoAs which correspond to a plurality of UL preferable Rx beams are predicted based on one DL preferable Tx beam, the BS can select one AoA by considering priorities given to Tx UEs which correspond to the plurality of UL preferable Rx beams. The priorities of the Tx UEs can be given based on a type of data to be transmitted, classes given to the Tx UEs, and/or the like.

If there is no AoA satisfying the criterion according to the preset threshold value, the BS can select one AoA which is the largest among the plurality of AoAs according to a scheme which has been described above. In this case, interference which is greater than interference predicted based on the threshold value can occur in a network. So, the BS can exclude a beam combination or UE combination which is based on the selected AoA upon configuring a beam pattern by considering a degree of IUI even though the largest AoA is selected.

As described above, in a case that a preset threshold value is used, it will be preferable that a BS maximizes the number of AoAs satisfying the preset threshold value. For example, in a case of two DL Tx beams B_tx #1 and B_tx #2 and two UL Rx beams B_rx #1 and B_rx #2, an AoA which corresponds to B_tx #1 and B_rx #1 can be selected if the AoA which corresponds to the B_tx #1 and the B_rx #1 is greater than the preset threshold value and is maximum. At this time, an AoA which corresponds to the B_tx #2 and the B_rx #2 is not greater than or equal to the preset threshold value.

In this case, the BS further needs to consider whether an AoA which corresponds to the B_tx #1 and the B_rx #2 is greater than or equal to the preset threshold value, and whether an AoA which corresponds to the B_tx #2 and the B_rx #1 is greater than or equal to the preset threshold value. If the additionally considered two AoAs are greater than or equal to the preset threshold value, it will be preferable that the BS selects the two AoAs satisfying the preset threshold value instead of selecting a maximum AoA.

The BS can configure a beam pattern based on a beam combination determined by one of proposed schemes. For example, the BS can designate a Tx UE and an Rx UE which correspond to each beam combination, and configure a UE combination by the designated Tx UE and Rx UE. The BS can allocate the same UL wireless resource or the same DL wireless resource to each of a Tx UE and an Rx UE included in one UE combination. The BS can configure a beam pattern designating a UL Rx beam and a DL Tx beam for a Tx UE and an Rx UE configuring a UE combination to which the same wireless resource will be allocated.

According to an embodiment of the present disclosure, resource allocation reference information can further include information about received signal strength in a Tx UE and an Rx UE. The BS can predict a distance between the BS and a UE based on received signal strength of the UE. This is for considering decrease of received signal strength due to signal loss proportional to the distance.

However, there can be various parameters which decrease received signal strength such as an obstacle as well as the distance. For additionally considering the various parameters, there is a need for including additional information into the resource allocation reference information.

After UE combinations are configured, the BS can set a beam pattern based on the configured UE combinations at operation 320, and perform a beamforming operation based on the set beam pattern to receive a signal from each of Tx UEs or transmit a signal to each of Rx UEs at operation 330.

Although FIG. 3 illustrates an example of a process of transmitting/receiving data based on a beamforming operation in a BS in a wireless communication system according to various embodiments of the present disclosure, various changes could be made to FIG. 3. For example, although shown as a series of operations, various operations in FIG. 3 could overlap, occur in parallel, occur in a different order, or occur multiple times.

An example of a process of transmitting/receiving data based on a beamforming operation in a BS in a wireless communication system according to various embodiments of the present disclosure has been described with reference to FIG. 3, and an example of a process of allocating a beam based on a preferable beam in a BS in a wireless communication system according to various embodiments of the present disclosure will be described with reference to FIG. 4.

Figure 4:
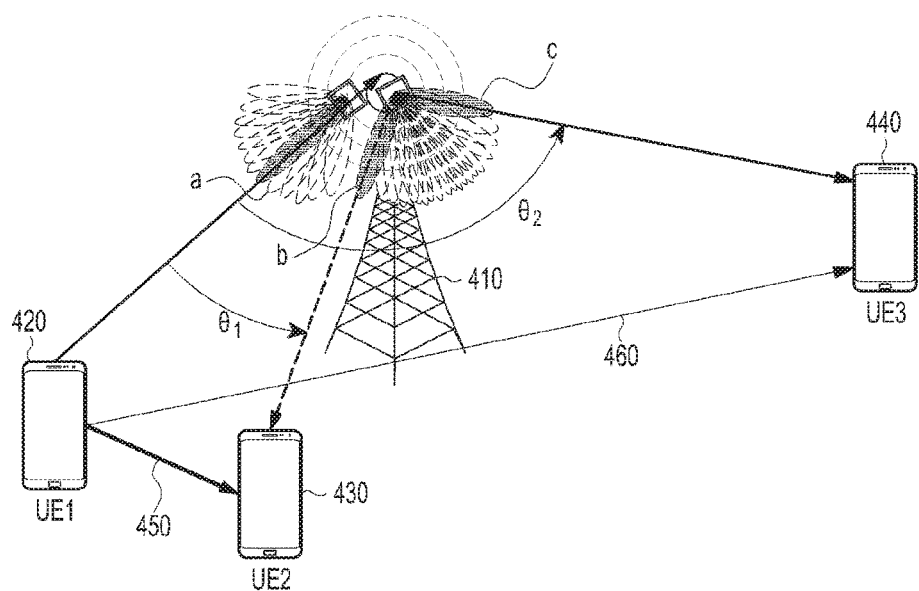
FIG. 4 schematically illustrates an example of a process of allocating a beam based on a preferable beam in a BS in a wireless communication system according to various embodiments of the present disclosure.

FIG. 4 schematically illustrates an example of a process of allocating a beam based on a preferable beam in a BS in a wireless communication system according to various embodiments of the present disclosure.

Referring to FIG. 4, a BS 410 can support a full-duplex scheme of receiving a signal from a Tx UE (UL UE) or transmitting to an Rx UE (DL UE) using the same wireless resource at the same time. A UE #1, UE #2, and UE #3 420, 430, and 440 can support a half-duplex scheme of transmitting or receiving a signal using a specific wireless resource. For example, in a system supporting a full-duplex scheme in a cellular network, there can be a plurality of Tx UEs and a plurality of Rx UEs at the same time.

A BS 410 can acquire a UL Rx beam and DL Tx beam with a maximum AoA based on preferable beam information, and configure a UE combination by a UE to which the acquired UL Rx beam will be allocated and an Rx UE to which the acquired DL Tx beam will be allocated. An AoA can be an included angle formed by one UL Rx beam and at least one DL Tx beam or an included angle formed by one DL Tx beam and at least one UL Rx beam. For example, the BS 410 can predict an AoA for at least one UL preferable Rx beam and at least one DL preferable Tx beam.

A UL preferable Rx beam can be one UL Rx beam which the BS 410 selects for the Tx UE based on UL received signal strength measured which is based on an RS received from the Tx UE. A DL preferable Tx beam can be one DL Tx beam which a UE selects and reports based on DL received signal strength measured which is based on an RS received from the BS 410.

For example, it will be assumed that a UE #1 420 is a Tx UE #1, and a UE #2 430 and a UE #3 440 are an Rx UE #1 and an Rx UE #2, respectively.

The Rx UE #1 430 and the Rx UE #2 440 can receive an RS which a BS 410 transmits according to beam sweeping and estimate quality of each DL based on the received RS. The Rx UE #1 430 and the Rx UE #2 440 can select at least one DL Tx beam to be requested to the BS 410 to allocate as a DL preferable Tx beam by considering the estimated quality of each DL. The Rx UE #1 430 selects a DL Tx beam b as a DL preferable Tx beam, and the Rx UE #2 440 selects a DL Tx beam c as a DL preferable Tx beam. Each of the Rx UE #1 430 and the Rx UE #2 440 can report preferable beam information including information indicating at least one DL Tx beam selected by each of the Rx UE #1 430 and the Rx UE #2 440 to the BS 410.

The Tx UE #1 420 can transmit an RS to an RS to the BS 410 according to beam sweeping. The BS 410 can estimate quality of each UL connected to the Tx UE #1 420 based on an RS received from the Tx UE #1 420. The BS 410 can select one UL preferable Rx beam to be allocated to the Tx UE #1 420 by considering the estimated quality of each UL. The BS 410 selects a UL Rx beam a as a UL preferable Rx beam for the Tx UE #1 420.

Here, a DL Tx beam index can indirectly imply a location of an Rx UE, and a UL Rx beam index can directly imply a location of a Tx UE.

The BS 410 can estimate an included angle, i.e., an AoA of each of one UL preferable Rx beam and two DL preferable Tx beams. That is, the BS 410 can estimate an AoA $\theta_1$ by a UL preferable Rx beam a selected for the Tx UE #1 420 and a DL preferable Tx beam b selected for the Rx UE #1 430 and an AoA $\theta_2$ by a UL preferable Rx beam a selected for the Tx UE #1 420 and a DL preferable Tx beam c selected for the Rx UE #2 440.

The BS 410 can acquire the greater one $\theta_2$ from the two AoAs $\theta_1$ and $\theta_2$ which are measured based on one UL Rx beam, and configure the Tx UE #1 420 and the Rx UE #2 440 for which the acquired $\theta_2$ is estimated as one UE combination. Even though two or more AoAs are estimated, the BS 410 can configure a UE combination by the largest AoA among the estimated AoAs.

For example, the BS 410 can configure a UE combination using Equation (1).

$$\underset{\substack{i \in \{DLUE\ Set\}, \\ j \in \{ULUE\ Set\}}}{\operatorname{argmax}} \theta_{ij}\left(= \cos^{-1}\left(\frac{v_i \cdot v_j}{\|v_i\|\|v_j\|}\right)\right) \quad \text{Equation (1)}$$

In Equation (1), $V_i$ and $V_j$ are a UL beam vector and a DL beam vector which are expressed with rectangular coordinates, respectively, and $V_i \cdot V_j$ denotes a vector inner product of $V_i$ and $V_j$ $\|V_i\|$ denotes a norm of a vector $V_i$. If a plurality of UL/DL UE combinations are selected, a UL/DL UE combination can be selected so that a relative angle of a beam is greater than a specific threshold value as expressed in Equation (2).

$$\underset{\substack{i \in \{DLUE\ Set\}, \\ j \in \{ULUE\ Set\}}}{\arg} \theta_{ij} > \gamma_{threshold1} \quad \text{Equation (2)}$$

In Equation (2), $\gamma_{threshold}$ denotes a minimum relative angle for pairing a UL UE and a DL UE.

If a UE combination is configured as described above, a Tx UE and an Rx UE which are relatively little affected by IUI will transmit or receive data using the same wireless resource. That is, the BS 410 can select the Rx UE #2 440 to which relatively small IUI 450 from the Tx UE #1 420 is predicted, not the Rx UE #1 430 to which relatively large IUI 460 from the Tx UE #1 420 is predicted for configuring the Rx UE #2 440 and the Tx UE #1 420 as a UE combination.

The reason why IUI can be predicted as described above is that it can be regarded that the larger an AoA is, the longer a distance between a Tx UE and an Rx UE. For example, if an AoA between the Tx UE #1 420 and the Rx UE #2 440 is greater than an AoA between the Tx UE #1 420 and the Rx UE #1 430, it can be predicted that a distance between the Tx UE #1 420 and the Rx UE #2 440 is longer than a distance between the Tx UE #1 420 and the Rx UE #1 430. Like this, it will be understood that the longer a distance between two UEs is, the more decreased IUI effect between the two UEs is.

For another example, the BS 410 can configure UE combinations using a preset threshold value. That is, the BS 410 can select candidate UE combinations for which an AoA satisfies the preset threshold value among possible UE combinations and acquire the maximum number of UE combinations in which a Tx UE and an Rx UE are not overlapped from the selected candidate UE combinations. The possible UE combinations can be all UE combinations which can be configured by DL preferable Tx beams collected from UEs and UL Rx beams selected per Tx UE. The reason why the Tx UE and the Rx UE are not overlapped is for preventing that one UE is included in a plurality of UE combinations. In this case, two or more beam indexes will not be allocated to one UE.

An example of a process of allocating a beam based on a preferable beam in a BS in a wireless communication system according to various embodiments of the present disclosure has been described with reference to FIG. 4, and an example of a signal processing process according to a process of allocating a beam based on a preferable beam in a wireless communication system according to various embodiments of the present disclosure will be described with reference to FIG. 5.

Figure 5:
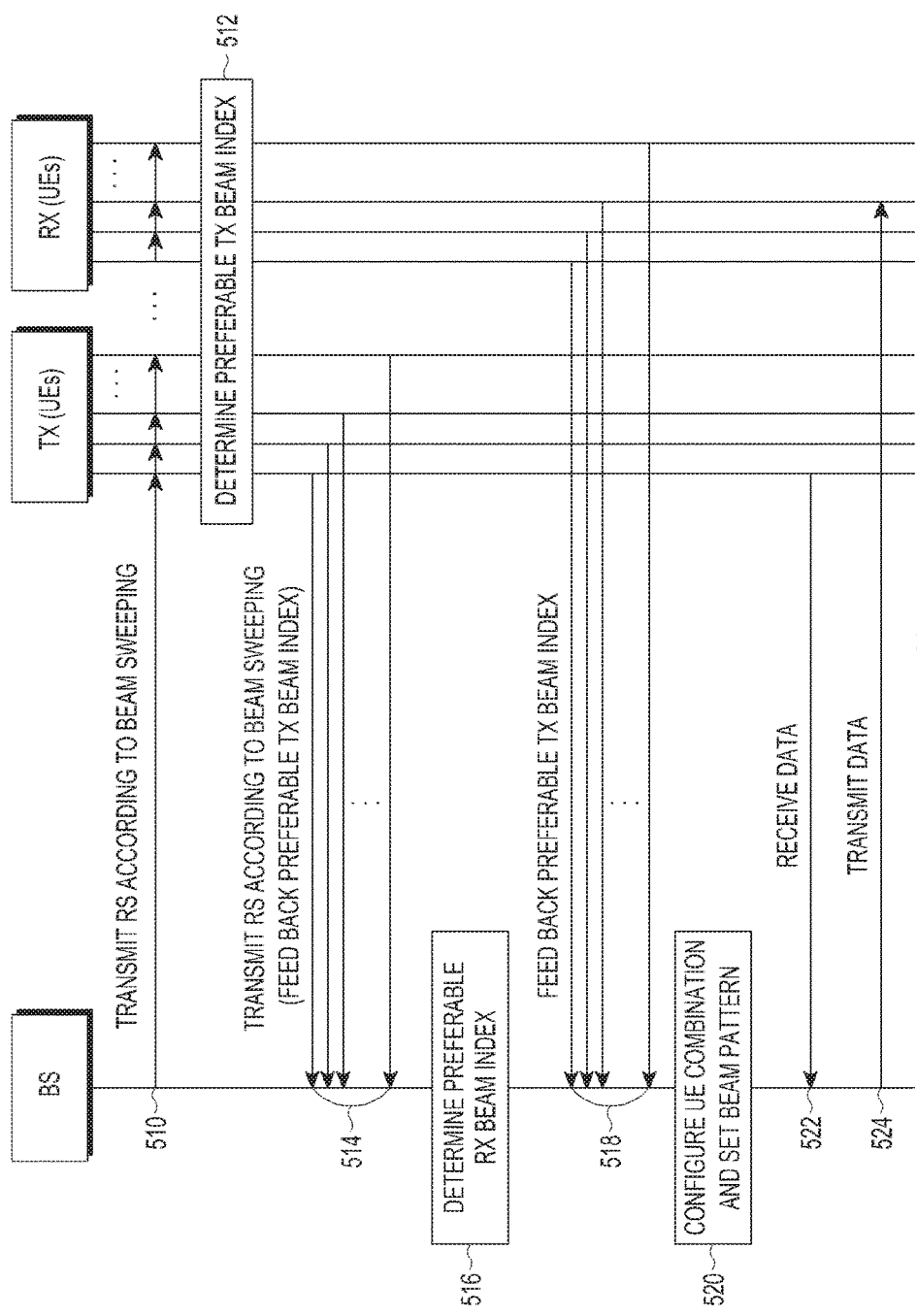
FIG. 5 schematically illustrates an example of a signal processing process according to a process of allocating a beam based on a preferable beam in a wireless communication system according to various embodiments of the present disclosure.

FIG. 5 schematically illustrates an example of a signal processing process according to a process of allocating a beam based on a preferable beam in a wireless communication system according to various embodiments of the present disclosure.

Referring to FIG. 5, a BS can transmit an RS to UEs which are classified into Tx UEs and Rx UEs according to beam sweeping at operation 510. That is, the BS sequentially selects all Tx beams which are configurable as a DL, and transmits the RS through the selected DL Tx beam.

The UEs can select a DL preferable Tx beam and a DL preferable Rx beam based on the RS transmitted by the BS, and determine a DL preferable Tx beam index and a DL preferable Rx beam index indicating the selected DL preferable Tx beam and DL preferable Rx beam at operation 512.

For example, the UEs receives the RS transmitted by the BS through a plurality of DLs to select at least one RS of which estimated quality is good among the received RSs. Here, the good quality can mean that the estimated quality satisfies preset threshold quality. The UEs identify a DL through which the at least one selected RS is received to select a Tx beam and an Rx beam forming the identified DL as a DL preferable Tx beam and a DL preferable Rx beam.

Each of Tx UEs among the UEs can transmit an RS to the BS according to beam sweeping at operation 514. Each of the Tx UEs can feedback information about the determined DL preferable Tx beam to the BS upon transmitting the RS. The information about the determined DL preferable Tx beam fed back from each of the Tx UEs to the BS can include a DL preferable Tx beam index.

A procedure in which each of UEs feeds back a DL Tx beam index to the BS based on the RS transmitted by the BS as described above will be referred to as 'DL beam sweep procedure'.

The BS can select a UL preferable Tx beam and a UL preferable Rx beam which correspond to each of the Tx UEs based on the RS transmitted by each of the Tx UEs and determine a UL preferable Tx beam index and a UL preferable Rx beam index indicating the selected UL preferable Tx beam and UL preferable Rx beam at operation 516.

For example, the BS can receive an RS which a Tx UE transmits through a plurality of ULs and select at least one RS of which estimated quality is good among the received RSs. Here, the good quality can mean that the estimated quality satisfies preset threshold quality. The BS identifies a UL through which the at least one selected RS is received to select a Tx beam and an Rx beam forming the identified UL as a UL preferable Tx beam and a UL preferable Rx beam.

A procedure in which a BS selects a UL preferable Tx beam index and a UL preferable Rx beam index based on an RS transmitted by a Tx UE will be referred to as 'UL beam sweep procedure'.

Each of the Rx UEs can feed back information about the determined DL preferable Tx beam to the BS at predetermined time at operation 518. The information about the DL preferable Tx beam fed back from each of the Rx UEs to the BS can include a DL preferable Tx beam index.

The BS can configure at least one UE combination based on preferable beam information configured with DL preferable Tx beam indexes collected per UE and UL preferable RX beam indexes determined per Tx UE, and set a beam pattern by the configured at least one UE combination at operation 520.

For example, the BS can select an AoA which is maximum among AoAs predicted per combination of each DL preferable Tx beam and UL preferable Rx beams and configure a UE combination by an Rx UE and a Tx UE which correspond to a DL preferable Tx beam and a UL preferable Rx beam for which the selected AoA is predicted.

For another example, the BS can select one or more AoAs which satisfy a preset threshold value among AoAs predicted per combination of each DL preferable Tx beam and UL preferable Rx beams, and select one AoA among the selected one or more AoAs by considering a UL preferable Rx beam which is not configured as other UE combination among the UL preferable Rx beams. The BS can configure a UE combination by an Rx UE and a Tx UE which correspond to a DL preferable Tx beam and a UL preferable Rx beam for which the selected AoA is predicted.

The BS can receive data transmitted by Tx UEs and transmit data to Rx UEs based on beamforming which is based on the set beam pattern at operations 522 and 524.

Although not sown in FIG. 5, a plurality of DL preferable Tx beam indexes can be fed back from an Rx UE. In this case, a BS can select one of the plurality of DL preferable Tx beam indexes fed back by the Rx UE and feed back information about the selected DL preferable Tx beam. The information about the selected DL preferable Tx beam can include a DL Tx beam index allocated for the Rx UE.

The BS can feedback, to each of Tx UEs, information about a UL preferable Rx beam for each of the Tx UEs. The information about the UL preferable Rx beam can include a UL Rx beam index which the BS selects for each of the Tx UEs.

An example of a signal processing process according to a process of allocating a beam based on a preferable beam in a wireless communication system according to various embodiments of the present disclosure has been described with reference to FIG. 5, and an example of a process of transmitting or receiving data in a UE in a wireless communication system according to various embodiments of the present disclosure will be described with reference to FIG. 6.

Figure 6:
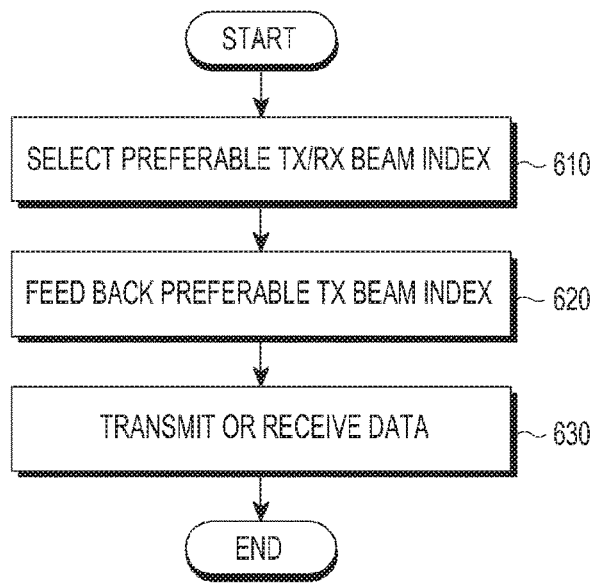
FIG. 6 schematically illustrates an example of a process of transmitting or receiving data in a UE in a wireless communication system according to various embodiments of the present disclosure.

FIG. 6 schematically illustrates an example of a process of transmitting or receiving data in a UE in a wireless communication system according to various embodiments of the present disclosure.

Referring to FIG. 6, a UE can select a DL preferable Tx beam and a DL preferable Rx beam which correspond to one DL based on an RS received through a plurality of DLs at operation 610. The UE can determine a DL preferable Tx beam index and a DL preferable Rx beam index indicating the selected DL preferable Tx beam and DL preferable Rx beam.

For example, the UE can receive the RS transmitted by the BS through the plurality of DLs and select at least one RS of which estimated quality is good among RSs received through the plurality of DLs. Here, the good quality can mean that the estimated quality satisfies preset threshold quality. The UE can identify a DL through which the at least one selected RS is received and select a Tx beam and an Rx beam forming the identified DL as a DL preferable Tx beam and a DL preferable Rx beam.

The UE can preset a threshold value for selecting a DL with good quality and select M DLs of which quality satisfies the preset threshold value among the RSs. Here, M can be an inter which is greater than or equal to 2.

The UE can feed back information about the determined DL preferable Tx beam to the BS at operation 620. The information about the determined DL preferable Tx beam can include a one DL preferable Tx beam index or M DL preferable Tx beam indexes. In a case that the UE is a Tx UE, the UE can transmit, to the BS, an RS according to beam sweeping upon feeding back the information about the determined DL preferable Tx beam.

Under permission of the BS, the UE can transmit data to the BS through a preferable UL or receive data from the BS through a preferable DL.

Although FIG. 6 illustrates an example of a process of transmitting or receiving data in a UE in a wireless communication system according to various embodiments of the present disclosure, various changes could be made to FIG. 6. For example, although shown as a series of operations, various operations in FIG. 6 could overlap, occur in parallel, occur in a different order, or occur multiple times.

An example of a process of transmitting or receiving data in a UE in a wireless communication system according to various embodiments of the present disclosure has been described with reference to FIG. 6, and an example of a process of transmitting or receiving data in a BS in a wireless communication system according to various embodiments of the present disclosure will described with reference to FIG. 7.

Figure 7:
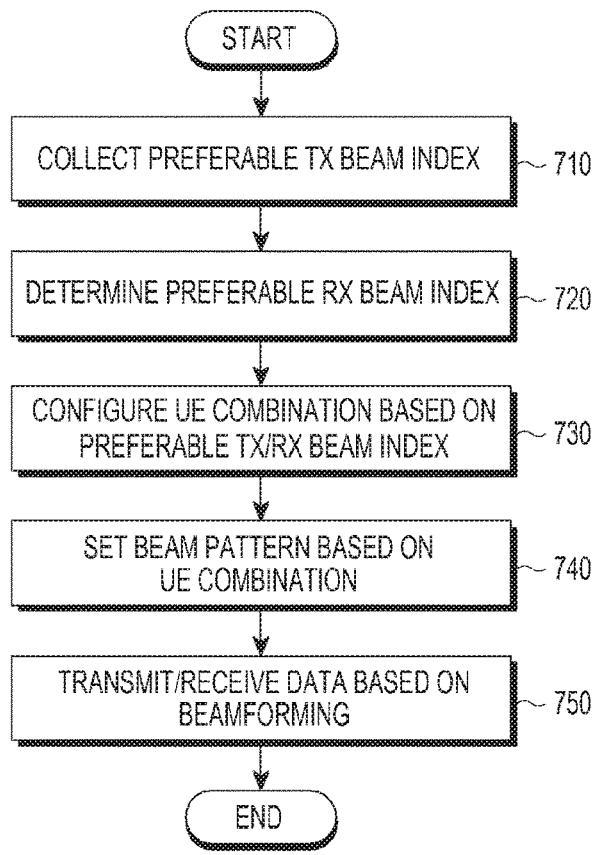
FIG. 7 schematically illustrates an example of a process of transmitting or receiving data in a BS in a wireless communication system according to various embodiments of the present disclosure.

FIG. 7 schematically illustrates an example of a process of transmitting or receiving data in a BS in a wireless communication system according to various embodiments of the present disclosure.

Referring to FIG. 7, a BS can collect a DL preferable Tx beam index based on information about a DL preferable Tx beam fed back from each of UEs at operation 710. For this, the BS can transmit an RS to the UEs according to beam sweeping. That is, the BS can sequentially select total Tx beams which can be formed as a DL, and transmit the RS based on the selected DL Tx beam.

The BS can determine a UL preferable Rx beam index for Tx UEs at operation 720. For this, the BS can receive an RS transmitted by each of the Tx UEs according to beam sweeping. The BS can select a UL preferable Tx beam and a UL preferable Rx beam which correspond to each of the Tx UEs based on the RS transmitted by each of the Tx UEs and determine a UL preferable Tx beam index and a UL preferable Rx beam index indicating the selected UL preferable Tx beam and UL preferable Rx beam.

The BS can configure at least one UE combination based on preferable beam information collected per UE at operation 730. For example, the BS can configure a UE combination based on a maximum AoA predicted by the preferable beam information collected per UE or an AoA satisfying a preset threshold value.

The BS can set a beam pattern based on the configured at least one UE combination at operation 740. The collected preferable beam information can include DL preferable Tx beam indexes and UL preferable Rx beam indexes determined per Tx UE.

The BS can receive data transmitted by the Tx UEs or transmit data to Rx UEs based on beamforming which is based on the set beam pattern at operation 750.

Although FIG. 7 illustrates an example of a process of transmitting or receiving data in a BS in a wireless communication system according to various embodiments of the present disclosure, various changes could be made to FIG. 7. For example, although shown as a series of operations, various operations in FIG. 7 could overlap, occur in parallel, occur in a different order, or occur multiple times.

An example of a process of transmitting or receiving data in a BS in a wireless communication system according to various embodiments of the present disclosure has been described with reference to FIG. 7, and an example of a process of allocating a beam based on a preferable beam and DL received power in a BS in a wireless communication system according to various embodiments of the present disclosure will be described with reference to FIG. 8.

Figure 8:
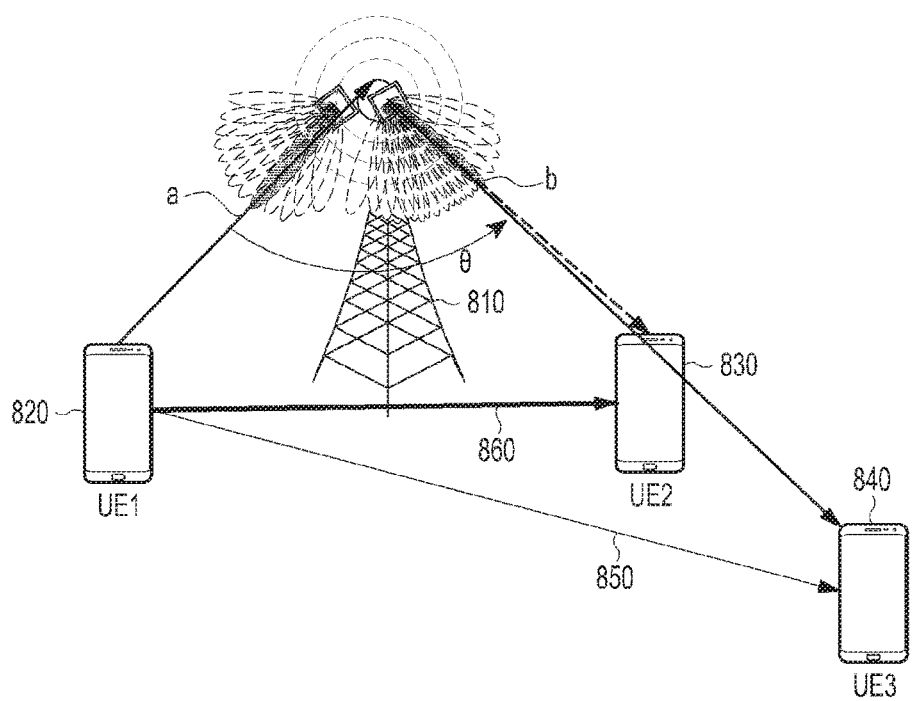
FIG. 8 schematically illustrates an example of a process of allocating a beam based on a preferable beam and DL received power in a BS in a wireless communication system according to various embodiments of the present disclosure.

FIG. 8 schematically illustrates an example of a process of allocating a beam based on a preferable beam and DL received power in a BS in a wireless communication system according to various embodiments of the present disclosure.

Referring to FIG. 8, a similar AoA is predicted based on preferable beam information and DL received signal strength information, so a BS 810 can configure a UE combination by a Tx UE and an Rx UE which is relatively far from the Tx UE. For example, the AoS can be predicted based on the preferable beam information, and a distance between the Tx UE and the Rx UE can be predicted based on the DL received signal strength information.

The AoA can be an included angle formed by one UL Rx beam and at least one DL Tx beam or an included angle formed by one DL Tx beam and at least one UL Rx beam. For example, the BS 810 can predict an AoA for at least one UL preferable Rx beam and at least one DL Tx beam. The BS 810 can determine a UL preferable Rx beam for each Tx UE based on UL received signal strength. The BS 810 can determine a DL preferable Rx beam for each Rx UE using information fed back from UEs.

For example, it will be assumed that a UE #1 820 is a Tx UE #1, and a UE #2 830 and a UE #3 840 are an Rx UE #1 and an Rx UE #2, respectively.

The Rx UE #1 830 and the Rx UE #2 840 select a DL Tx beam b as a DL preferable Tx beam based on an RS which the BS 810 transmits according to beam sweeping. The BS 810 determines that the Rx UE #1 830 and the Rx UE #2 840 are located at the similar direction, so the Rx UE #1 830 and the Rx UE #2 840 can select the same DL Tx beam b as a DL preferable Tx beam. The Rx UE #1 830 and the Rx UE #2 840 can report information about the selected DL preferable Tx beam b (an index of the DL preferable Tx beam b) to the BS 810.

The BS 810 can estimate quality of each UL connected to the Tx UE #1 820 based on received signal strength of an RS which the Tx UE #1 820 transmits according to beam sweeping, and/or the like. The BS 810 can determine a UL Rx beam for the Tx UE #1 820 by selecting one of the ULs connected to the Tx UE #1 820 based on the estimated quality of each UL. It will be assumed that the BS 810 selects a UL Rx beam a as a UL preferable Rx beam for the Tx UE #1 820.

The BS 810 can estimate an AoA for each of the Rx UE #1 830 and the Rx UE #2 840 based on the acquired preferable beam information, i.e., DL preferable Tx beam information and UL preferable Rx beam information. At this time, the BS 810 will recognize that an AoA θ of the Rx UE #1 830 and an AoA θ of the Rx UE #2 840 are the same. It is estimated that the AoA θ of the Rx UE #1 830 and the AoA θ of the Rx UE #2 840 are the same, so the BS 810 can recognize that the Rx UE #1 830 and the Rx UE #2 840 are located at the same direction. In this case, the BS 810 can one Rx UE which is relatively far from the Tx UE #1 820 among the Rx UE #1 830 and the Rx UE #2 840 based on DL received signal strength information reported by each of the Rx UE #1 830 and the Rx UE #2 840.

For example, the BS 810 can compare DL received signal strength #1 reported by the Tx UE #1 820 and each of DL received signal strength #2 reported by the Rx UE #1 830 and DL received signal strength #3 reported by the Rx UE #2 840, and select one Rx UE of which a difference between the DL received signal strength #1 and DL received signal strength of the one Rx UE is large from the Rx UE #1 830 and the Rx UE #2 840. That is, the BS selects one of the Rx UE #1 830 and the Rx UE #2 840, and a difference between DL received signal strength reported by the selected Rx UE and the DL received signal strength #1 reported by the Tx UE #1 820 is greater than a difference between DL received signal strength reported by an Rx UE which is not selected and the DL received signal strength #1 reported by the Tx UE #1 820.

As shown in FIG. 8, it will be predicted that a difference between the DL received signal strength #1 and the DL received signal strength #3 is greater than a difference between the DL received signal strength #1 and the DL received signal strength #2. A case that a difference between DL received signal strength is large will be understood as a case that an Rx UE is relatively far from a Tx UE.

The BS 810 can configure the Tx UE #1 820 and the Rx UE #2 840 finally selected as one UE combination.

If a UE combination is configured as described above, a Tx UE and an Rx UE which are relatively little affected by IUI will transmit or receive data using the same wireless resource. That is, the BS 810 can select the Rx UE #2 840 to which relatively small IUI 850 from the Tx UE #1 820 is predicted, not the Rx UE #1 830 to which relatively large IUI 860 from the Tx UE #1 820 is predicted for configuring the Rx UE #2 840 and the Tx UE #1 820 as a UE combination.

An example of a process of allocating a beam based on a preferable beam and DL received power in a BS in a wireless communication system according to various embodiments of the present disclosure has been described with reference to FIG. 8, and an example of a signal processing process according to a process of allocating a beam based on a preferable beam and DL received power in a BS in a wireless communication system according to various embodiments of the present disclosure will be described with reference to FIG. 9.

Figure 9:
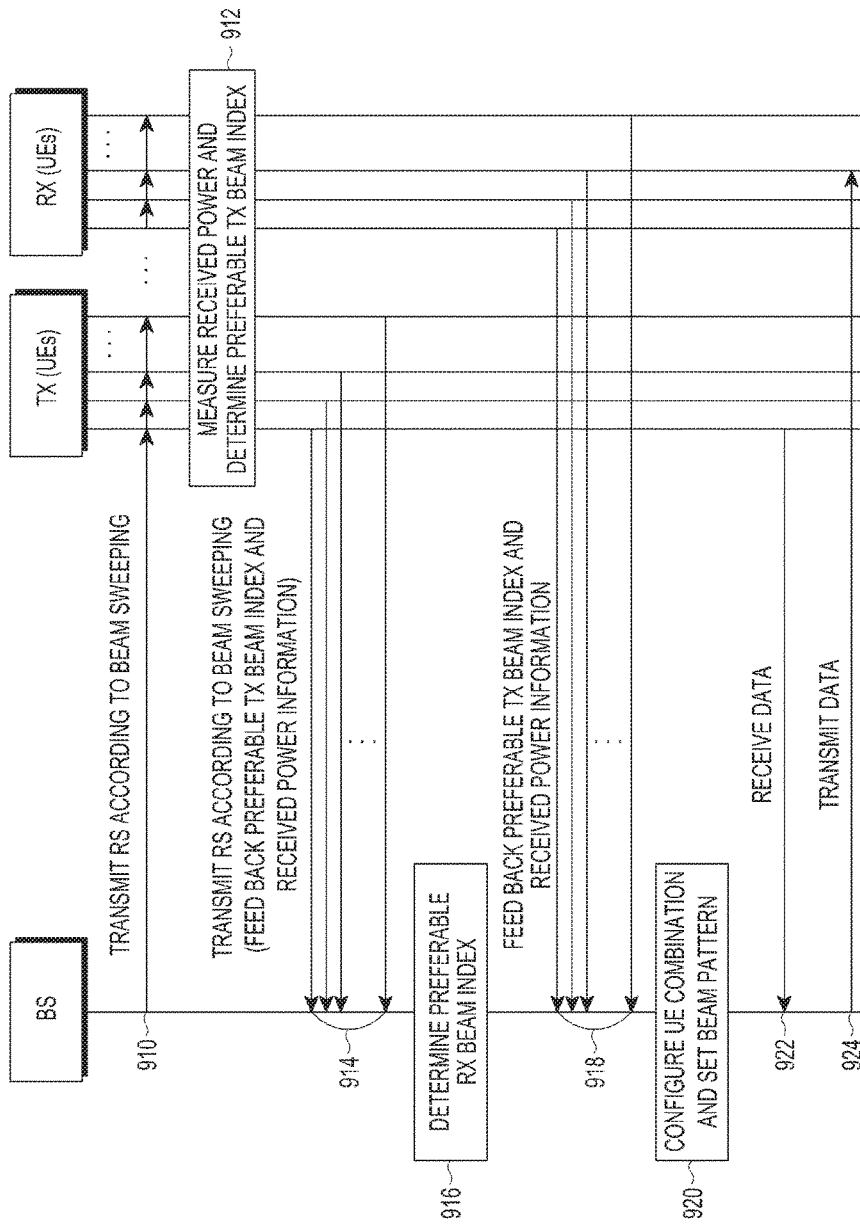
FIG. 9 schematically illustrates an example of a signal processing process according to a process of allocating a beam based on a preferable beam and DL received power in a BS in a wireless communication system according to various embodiments of the present disclosure.

FIG. 9 schematically illustrates an example of a signal processing process according to a process of allocating a beam based on a preferable beam and DL received power in a BS in a wireless communication system according to various embodiments of the present disclosure.

Referring to FIG. 9, a BS can select sequentially total DL Tx beams according to beam sweeping and transmit an RS to UEs including Tx UEs and Rx UEs through the selected DL Tx beam at operation 910.

The UEs can estimate received power on each DL based on RSs received through a plurality of DLs and determine one preferable DL based on received power measured per DL at operation 912.

That is, the UEs can estimate quality per DL based on the RS transmitted by the BS, select one DL based on the estimation, and determine a DL preferable Tx beam index and a DL preferable Rx beam index indicating a DL preferable Tx beam and a DL preferable Rx beam which correspond to the selected one DL. The UEs can estimate the quality per DL based on received power of an RS received through a corresponding DL. The received power can be defined as received signal strength of the RS. For example, the UEs can select one DL of which the received signal strength is the strongest among the plurality of DLs.

Each of the Tx UEs among the UEs can transmit an RS according to beam sweeping at operation 914. Each of the Tx UEs can feed back information about the determined DL preferable Tx beam and received power information to the BS upon transmitting the RS. The information about the DL preferable Tx beam can include a DL preferable Tx beam index. The received power information can be configured based on received signal strength measured on a preferable DL.

The BS can estimate quality per UL based on an RS transmitted by each of the Tx UEs, select one UL based on the estimation, and determine a UL preferable Tx beam index and a UL preferable Rx beam index indicating a UL preferable Tx beam and a UL preferable Rx beam which correspond to the selected one UL at operation 916.

Each of the Rx UEs can feed back information about the determined DL preferable Tx beam and received power information to the BS at predetermined time at operation 918. The information about the DL preferable Tx beam can include a DL preferable Tx beam index, and the received power information can include received signal strength measured on a preferable DL.

The BS can configure at least one UE combination based on preferable beam information and received power information, and set a beam pattern based on the configured at least one UE combination at operation 920. The preferable beam information can include DL preferable Tx beam indexes collected per UE and UL preferable Rx beam indexes determined per Tx UE. The received power information can include received signal strength measured on a preferable DL at each Tx UE.

The BS can receive data transmitted by Tx UEs or transmit data to Rx UEs according to beamforming which is based on the set beam pattern at operations 922 and 924.

Although now shown in FIG. 9, a plurality DL preferable Tx beam indexes can be fed back from an Rx UE. In this case, the BS can select one of the plurality of DL preferable Tx beam indexes fed back from the Rx UE, and feed back information about the selected DL preferable Tx beam index to the Rx UE. The information about the selected DL preferable Tx beam index can include a DL Tx beam index for the Rx UE.

The BS can feed back information about a UL preferable Rx beam for each of Tx UEs to each of the Tx UEs. The information about the UL preferable Rx beam can include a UL preferable Rx beam index selected by the BS for each of Tx UEs.

An example of a signal processing process according to a process of allocating a beam based on a preferable beam and DL received power in a BS in a wireless communication system according to various embodiments of the present disclosure has been described with reference to FIG. 9, and another example of a process of transmitting or receiving data in a UE in a wireless communication system according to various embodiments of the present disclosure will be described with reference to FIG. 10.

Figure 10:
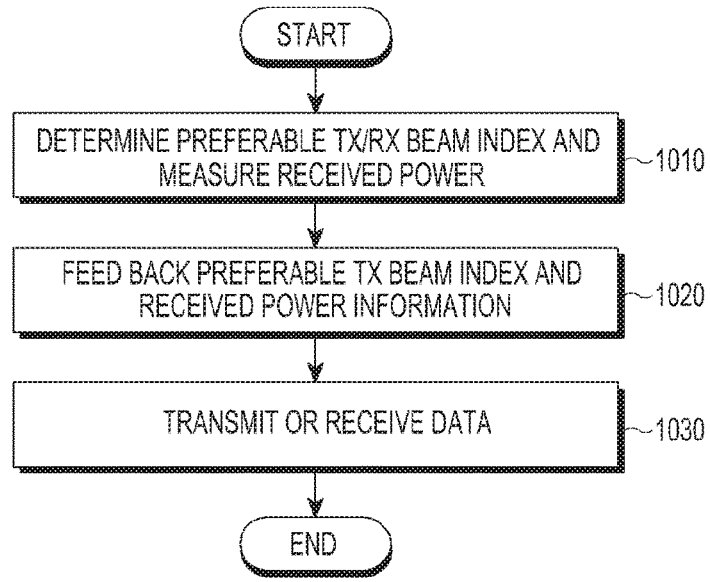
FIG. 10 schematically illustrates another example of a process of transmitting or receiving data in a UE in a wireless communication system according to various embodiments of the present disclosure.

FIG. 10 schematically illustrates another example of a process of transmitting or receiving data in a UE in a wireless communication system according to various embodiments of the present disclosure.

Referring to FIG. 10, a UE can estimate received power of each of plurality of DLs based on RSs which the UE receives from a BS through the plurality of DLs, and select one DL based on the received power measured at each DL at operation 1010. The UE can estimate received signal strength based on the measured received power. One DL preferable Tx beam and one DL preferable Rx beam can be determined based on the selected one DL.

The UE can feed back information about the DL preferable Tx beam and received power information to the BS at operation 1020. The information about the DL preferable Tx beam can include a DL preferable Tx beam index indicating the determined DL preferable Tx beam. The received power information can include received signal strength which the UE measures at a preferable DL.

In a case that the UE is a Tx UE, the UE can transmit an RS according to beam sweeping upon feeding back the information about the DL preferable Tx beam and the received power information.

The UE can transmit data to the BS through a preferable UL or receive data from the BS through a preferable DL at operation 1030.

Although FIG. 10 illustrates another example of a process of transmitting or receiving data in a UE in a wireless communication system according to various embodiments of the present disclosure, various changes could be made to FIG. 10. For example, although shown as a series of operations, various operations in FIG. 10 could overlap, occur in parallel, occur in a different order, or occur multiple times.

Another example of a process of transmitting or receiving data in a UE in a wireless communication system according to various embodiments of the present disclosure has been described with reference to FIG. 10, and another example of a process of transmitting or receiving data in a BS in a wireless communication system according to various embodiments of the present disclosure will be described with reference to FIG. 11.

Figure 11:
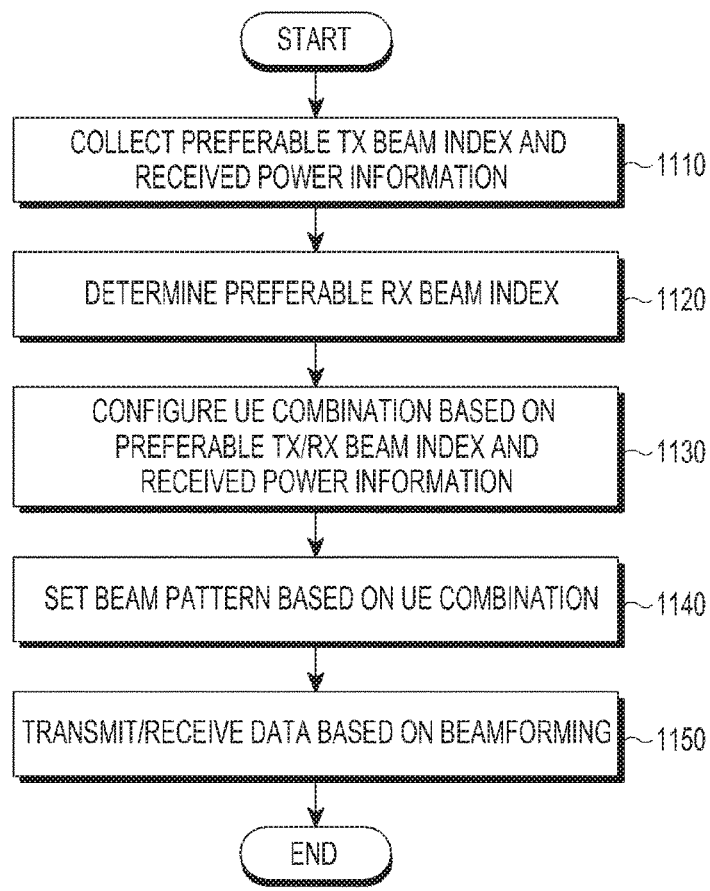
FIG. 11 schematically illustrates another example of a process of transmitting or receiving data in a BS in a wireless communication system according to various embodiments of the present disclosure.

FIG. 11 schematically illustrates another example of a process of transmitting or receiving data in a BS in a wireless communication system according to various embodiments of the present disclosure.

Referring to FIG. 11, a BS can collect information about a DL preferable Tx beam and received power information fed back from each of UEs at operation 1110. For this, the BS can transmit an RS to the UEs according to beam sweeping. That is, the BS can sequentially select total DL Tx beams which can be formed as a DL, and transmit the RS through the selected DL Tx beam. The received power information fed back from each of the UEs can include received signal strength which is measured based on an RS received through a DL according to a DL preferable Tx beam.

The BS can select a UL preferable Tx beam and/or a UL preferable Rx beam which corresponds to each of Tx UEs based on an RS which each of the Tx UEs transmits according to beam sweeping at operation 1120. The BS can determine a DL preferable Tx beam index and a DL preferable Rx beam index indicating the selected DL preferable Tx beam and DL preferable Rx beam.

The BS can configure at least one UE combination based on preferable beam information and received power information collected per UE at operation 1130. For example, the BS can select a UE combination of which an AoA is predicted to satisfy a preset threshold value among configurable UE combinations based on one Tx UE (can correspond to one UL preferable Rx beam) or one Rx UE (can correspond to one DL preferable Tx beam) using preferable beam information. If there are a plurality of UE combinations which are selected corresponding to the one Tx UE (can correspond to the one UL preferable Rx beam) or the one Rx UE (can correspond to the one DL preferable Tx beam), the BS can finally select a UE combination of which a difference between received signal strength of a Tx UE and received signal strength of an Rx UE is the largest among the plurality of UE combinations. The BS can acquire the difference between the received signal strength of the Tx UE and the received signal strength of the Rx UE based on the received power information collected from the UEs.

As described above, in a case that a plurality of Rx UEs have a similar AoA for a specific Tx UE, the BS can select one Rx UE which will be configured as a UE combination with the specific Tx UE based on received power information reported by the plurality of Rx UEs.

The BS can configure a UE combination by additionally considering a modulation scheme (modulation level) to be applied for transmitting/receiving a signal as well as the collected preferable beam information and received power information.

The BS can set a beam pattern based on the configured at least one UE combination at operation 1140. The collected preferable beam information can include DL preferable Tx beam indexes fed back from UEs and UL preferable Rx beam indexes determined per Tx UE.

For example, the BS can configure candidate UE combinations based on preferable beam information and determine a final UE combination among the candidate UE combinations based on the received power information. An operation for this has been described above, so a detailed description thereof will be omitted herein.

The BS can receive data transmitted by Tx UEs or transmit data to Rx UEs according to beamforming which is based on the set beam pattern at operation 1150.

Although FIG. 11 illustrates another example of a process of transmitting or receiving data in a BS in a wireless communication system according to various embodiments of the present disclosure, various changes could be made to FIG. 11. For example, although shown as a series of operations, various operations in FIG. 11 could overlap, occur in parallel, occur in a different order, or occur multiple times.

Another example of a process of transmitting or receiving data in a BS in a wireless communication system according to various embodiments of the present disclosure has been described with reference to FIG. 11, and an example of a process of allocating a beam based on a type of a UE in a BS in a wireless communication system according to various embodiments of the present disclosure will be described with reference to FIG. 12A.

Figure 12A:
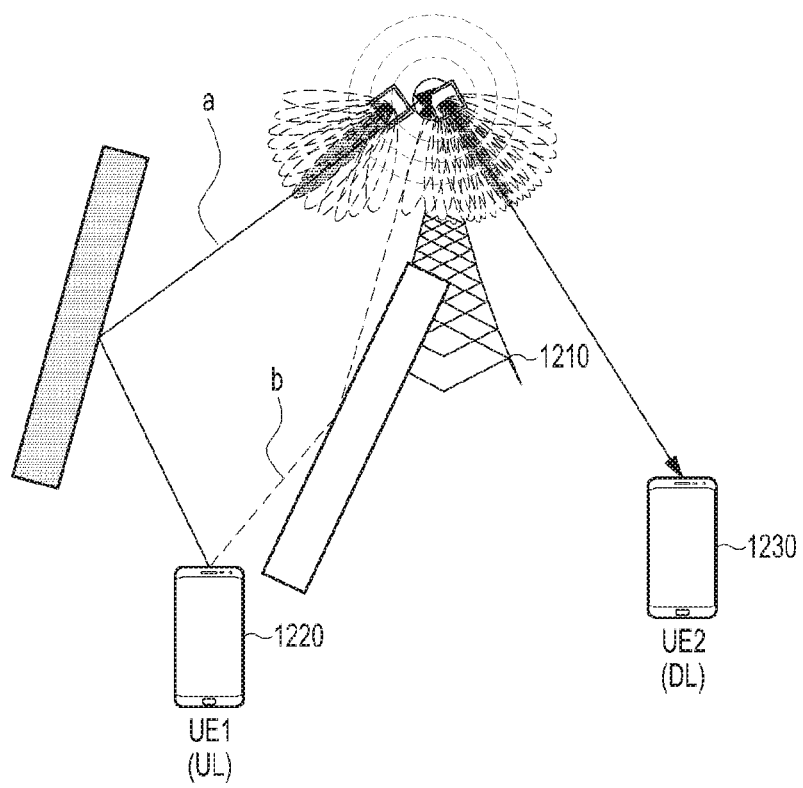
FIG. 12A schematically illustrates an example of a process of allocating a beam based on a type of a UE in a BS in a wireless communication system according to various embodiments of the present disclosure.

FIG. 12A schematically illustrates an example of a process of allocating a beam based on a type of a UE in a BS in a wireless communication system according to various embodiments of the present disclosure.

Referring to FIG. 12A, a BS 1210 can determine whether an NLoS-type UE exists based on preferable beam information including a DL preferable Tx beam index of at least one Rx UE and a UL preferable Rx beam index of at least one Tx UE. For example, a Tx UE 1220 is an NLoS-type UE transmitting a signal at an NLoS environment, and a Rx UE 1230 is an LoS-type UE receiving a signal at an LoS environment. The signal transmitted by the NLoS-type Tx UE 1220 will be transferred to the BS 1210 through a plurality of ULs with different delays, e.g., ULs a, b, and/or the like. So, the BS 1210 needs to independently allocate a UL Rx beam which corresponds to each of the ULs a and b for the NLoS-type Tx UE 1220.

An example of a process of allocating a beam based on a type of a UE in a BS in a wireless communication system according to various embodiments of the present disclosure has been described with reference to FIG. 12A, and another example of a process of allocating a beam based on a type of a UE in a BS in a wireless communication system according to various embodiments of the present disclosure will be described with reference to FIG. 12B.

Figure 12B:
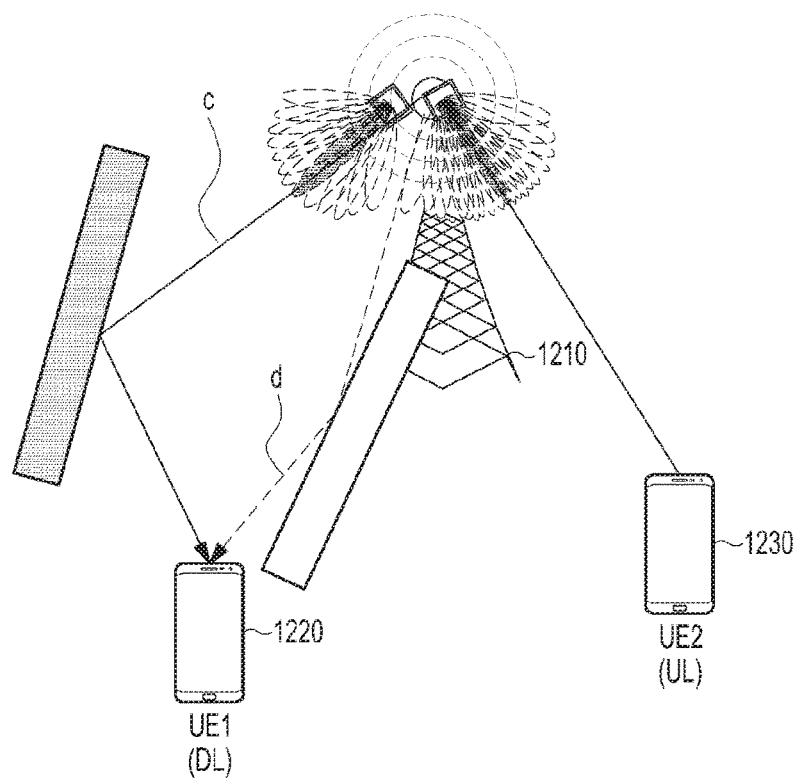
FIG. 12B schematically illustrates another example of a process of allocating a beam based on a type of a UE in a BS in a wireless communication system according to various embodiments of the present disclosure.

FIG. 12B schematically illustrates another example of a process of allocating a beam based on a type of a UE in a BS in a wireless communication system according to various embodiments of the present disclosure.

Referring to FIG. 12B, a BS 1210 can determine whether an NLoS-type UE exists based on preferable beam information including a DL preferable Tx beam index of at least one Rx UE and a UL preferable Rx beam index of at least one Tx UE. For example, an Rx UE 1220 is an NLoS-type UE receiving a signal at an NLoS environment, and a Tx UE 1230 is an LoS-type UE transmitting a signal at an LoS environment. The signal received from the BS in the NLoS-type Rx UE 1220 can be received through a plurality of DLs with different delays, e.g., DLs c and d. So, the BS 1210 needs to independently allocate a DL Tx beam which corresponds to each of the DLs c and d for the NLoS-type Rx UE 1220.

Further, all of a Tx UE and an Rx UE as well as a combination in FIGS. 12A and 12 B can be NLoS type-UEs.

As described above, in a case that a beam is allocated based on a type of a UE, a BS can estimate a vector value of an LoS component according to transmission and reception by using a UL preferable Rx beam index or a DL Tx beam index for an NLoS type-UE as reference information. At this time, the BS can manage IUI based on a beam index using the estimated vector value.

Still another example of a process of transmitting or receiving data based on a type of a UE in a BS in a wireless communication system according to various embodiments of the present disclosure will be described with reference to FIG. 13.

Figure 13:
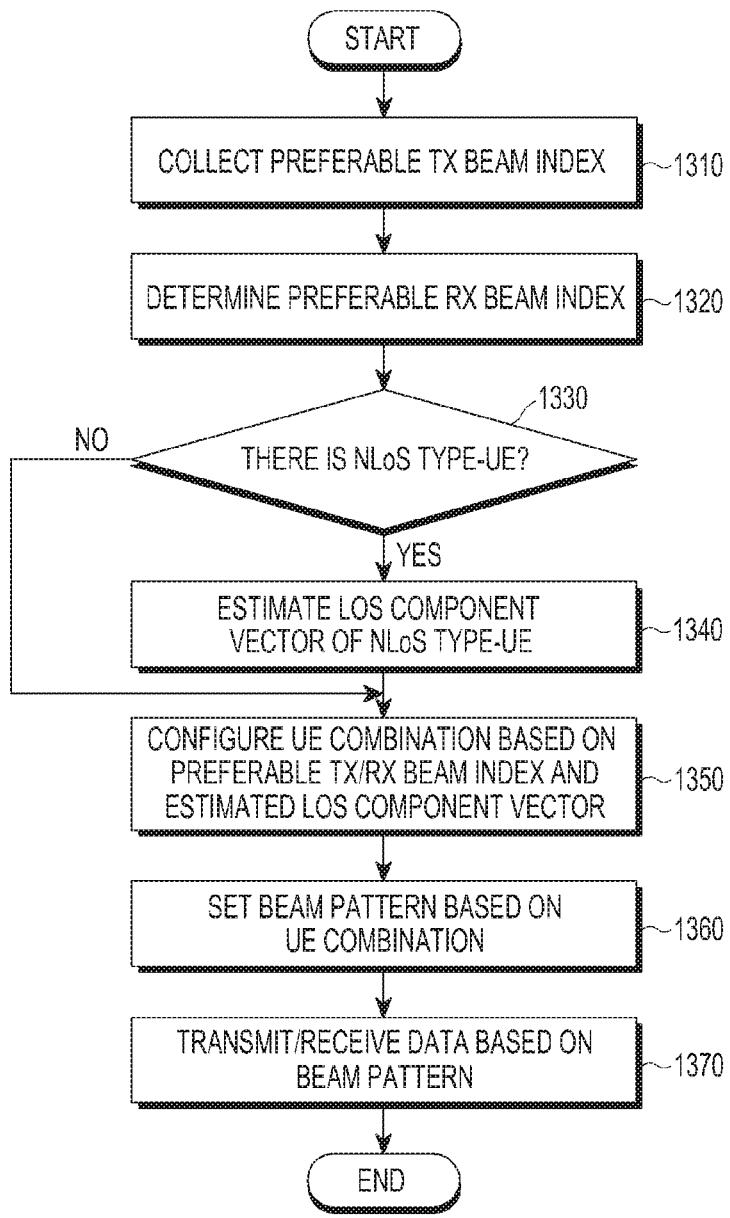
FIG. 13 schematically illustrates still another example of a process of transmitting or receiving data based on a type of a UE in a BS in a wireless communication system according to various embodiments of the present disclosure.

FIG. 13 schematically illustrates still another example of a process of transmitting or receiving data based on a type of a UE in a BS in a wireless communication system according to various embodiments of the present disclosure.

Referring to FIG. 13, a BS can collect information about a DL preferable Tx beam fed back from UEs at operation 1310. For this, the BS can transmit an RS to the UEs according to beam sweeping. That is, the BS can sequentially select total Tx beams which can be formed as a DL, and transmit the RS through the selected DL Tx beam.

The BS can receive received power information as well as information about the DL preferable Tx beam from the UEs. The received power information can include received signal strength which is measured based on an RS received through a DL according to a DL preferable Tx beam. For convenience, it will be assumed that only preferable beam information is fed back from a UE. However, it will be clearly understood that most operations except that a parameter considered for configuring a UE combination is different can be the same even though received signal strength is additionally fed back.

The BS can select a UL preferable Tx beam and/or a UL preferable Rx beam which corresponds to each of the Tx UEs based on an RS which each of the Tx UEs transmits according to beam sweeping at operation 1320. The BS can determine a UL preferable Tx beam index and a UL preferable Rx beam index indicating the selected UL preferable Tx beam and UL preferable Rx beam.

The BS can determine whether an NLoS type-UE exists at operation 1330. For example, the BS can determine whether the NLoS type-UE exists based on preferable beam information collected per UE, i.e., a DL preferable Tx beam index and a UL preferable Rx index.

If the NLoS type-UE exists, the BS can estimate an LoS component vector for the NLoS type-UE based on a Tx and/or Rx beam index of the NLoS type-UE at operation 1340. In this case, the BS can configure a UE combination based on a DL preferable Tx beam index and a UL preferable Rx beam index selected or collected per UE and the estimated LoS component vector at operation 1350. That is, the BS can select a Tx UE and an Rx UE and configure a UE combination with the selected Tx UE and Rx UE thereby an angle for an LoS of the Tx UE or Rx UE is greater than or equal to a preset threshold value.

If the NLoS type-UE does not exist, the BS can configure a UE combination based on a DL preferable Tx beam index and a UL preferable Rx beam index selected or collected per UE. At this time, the BS can select a Tx UE and an Rx UE and configure a UE combination with the selected Tx UE and Rx UE thereby an angle for an LoS of the Tx UE or Rx UE is greater than or equal to a preset threshold value.

The BS can set a beam pattern based on the configured at least one UE combination at operation 1360. The BS can receive data transmitted by Tx UEs and transmit data to Rx UEs based on beamforming which is based on the set beam pattern at operation 1370.

Although FIG. 13 illustrates still another example of a process of transmitting or receiving data based on a type of a UE in a BS in a wireless communication system according to various embodiments of the present disclosure, various changes could be made to FIG. 13. For example, although shown as a series of operations, various operations in FIG. 13 could overlap, occur in parallel, occur in a different order, or occur multiple times.

Still another example of a process of transmitting or receiving data based on a type of a UE in a BS in a wireless communication system according to various embodiments of the present disclosure has been described with reference to FIG. 13, and an example of a process of configuring a UE combination based on IUI and SI and selecting a beam based on a UE combination in a wireless communication system according to various embodiments of the present disclosure will be described with reference to FIG. 14.

Figure 14:
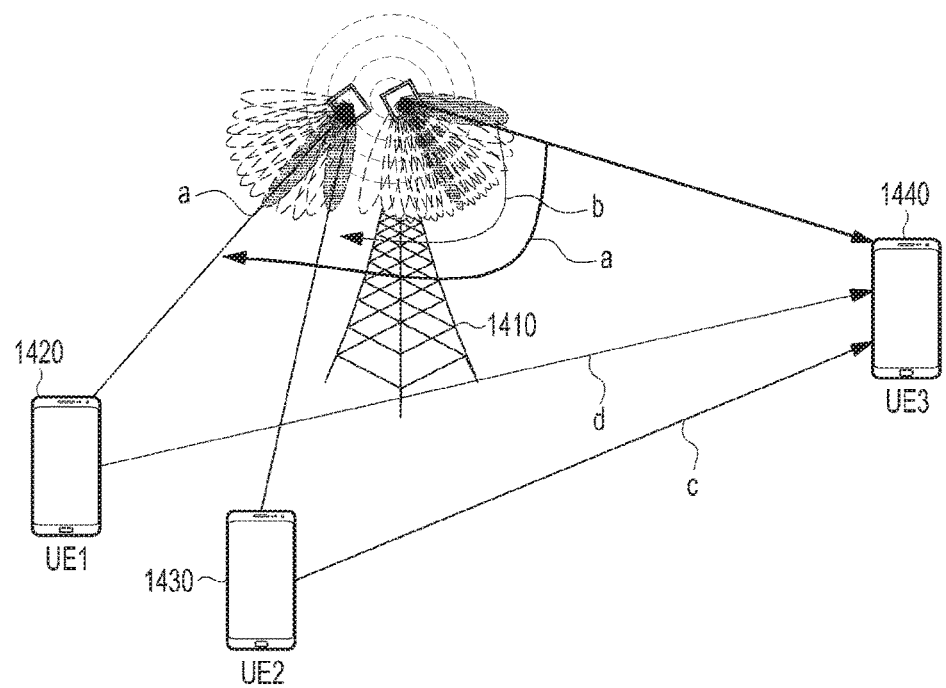
FIG. 14 schematically illustrates an example of a process of configuring a UE combination based on IUI and SI and selecting a beam based on a UE combination in a wireless communication system according to various embodiments of the present disclosure.

FIG. 14 schematically illustrates an example of a process of configuring a UE combination based on IUI and SI and selecting a beam based on a UE combination in a wireless communication system according to various embodiments of the present disclosure.

Referring to FIG. 14, in a case that a BS 1410 is sufficiently capable of performing a self-interference cancellation (SIC) operation regardless of a UE combination, the BS 1410 can configure a UE combination including a Tx UE and an Rx UE by considering only IUI. In a case that the BS 1410 is not sufficiently capable of performing the SIC operation according to a UE combination, the BS 1410 can configure a UE combination with a Tx UE and an Rx UE and select a beam by considering IUI and SI.

For example, it will be assumed that a UE #1 1420 is a Tx UE #1, a UE #2 1430 is a Tx UE #2, and a UE #3 1440 is an Rx UE #1.

As shown in FIG. 14, the BS 1410 will configure the Tx UE #1 1420 and the Rx UE #1 1440 as one UE combination upon considering only an AoA which is predicted based on preferable beam information and/or DL received signal strength, and/or the like. That is, in a case that only IUI is considered, the BS 1410 will select the Tx UE #1 1420 as a Tx UE which will be configured with the Rx UE #1 1440 as a UE combination. The reason why IUI d predicted between the Rx UE #1 1440 and the Tx UE #1 1420 is less than IUI c predicted between the Rx UE #1 1440 and the Tx UE #2 1430 when an AoA is considered.

However, if SI is additionally considered, the result can be varied. The reason why IUI a predicted between the Rx UE #1 1440 and the Tx UE #1 1420 can be greater than IUI b predicted between the Rx UE #1 1440 and the Tx UE #2 1430.

In this case, it can be preferable that the BS 1410 determines a Tx UE and an Rx UE configuring a UE combination by considering a UL performance which is affected by SI and a DL performance which is affected by IUI.

For example, the BS 1410 can select a Tx UE and an Rx UE thereby a total system performance is maximized based on Equation (3).

$$\underset{\substack{i\in\{DLUESet\}\\j\in\{ULUESet\}}}{\mathrm{argmax}}\ (\log(1+SINR_i)+\log(1+SINR_j)) =>$$

Equation (3)

$$\underset{\substack{i\in\{DLUESet\}\\j\in\{ULUESet\}}}{\mathrm{argmax}}\left(\begin{array}{c}\log\!\left(1+\left(\dfrac{S}{I_{IUI}+I_2+N}\right)_i\right)+\\ \log\!\left(1+\left(\dfrac{S}{I_{SI}+I_1+N}\right)_j\right)\end{array}\right)$$

$I_{SI}$: Residual SI $I_1$: Inter-BS interference, neighbor cell UE interference, and/or the like $I_{IUI}$: Intra-cell inter-user interface $I_2$: Inter-cell inter-user interface, neighbor cell BS interference, and/or the like In a case that a UE combination is configured as described above, it can be preferable that the Tx UE #2 1430 and the Rx UE #1 1440 which are not affected by IUI and SI transmit or receive data using the same wireless resource.

An example of a process of configuring a UE combination based on IUI and SI and selecting a beam based on a UE combination in a wireless communication system according to various embodiments of the present disclosure has been described with reference to FIG. 14, and an example of a signal processing process according to a process of configuring a UE combination based on IUI and SI and selecting a beam based on a UE combination in a wireless communication system according to various embodiments of the present disclosure will be described with reference to FIG. 15.

Figure 15:
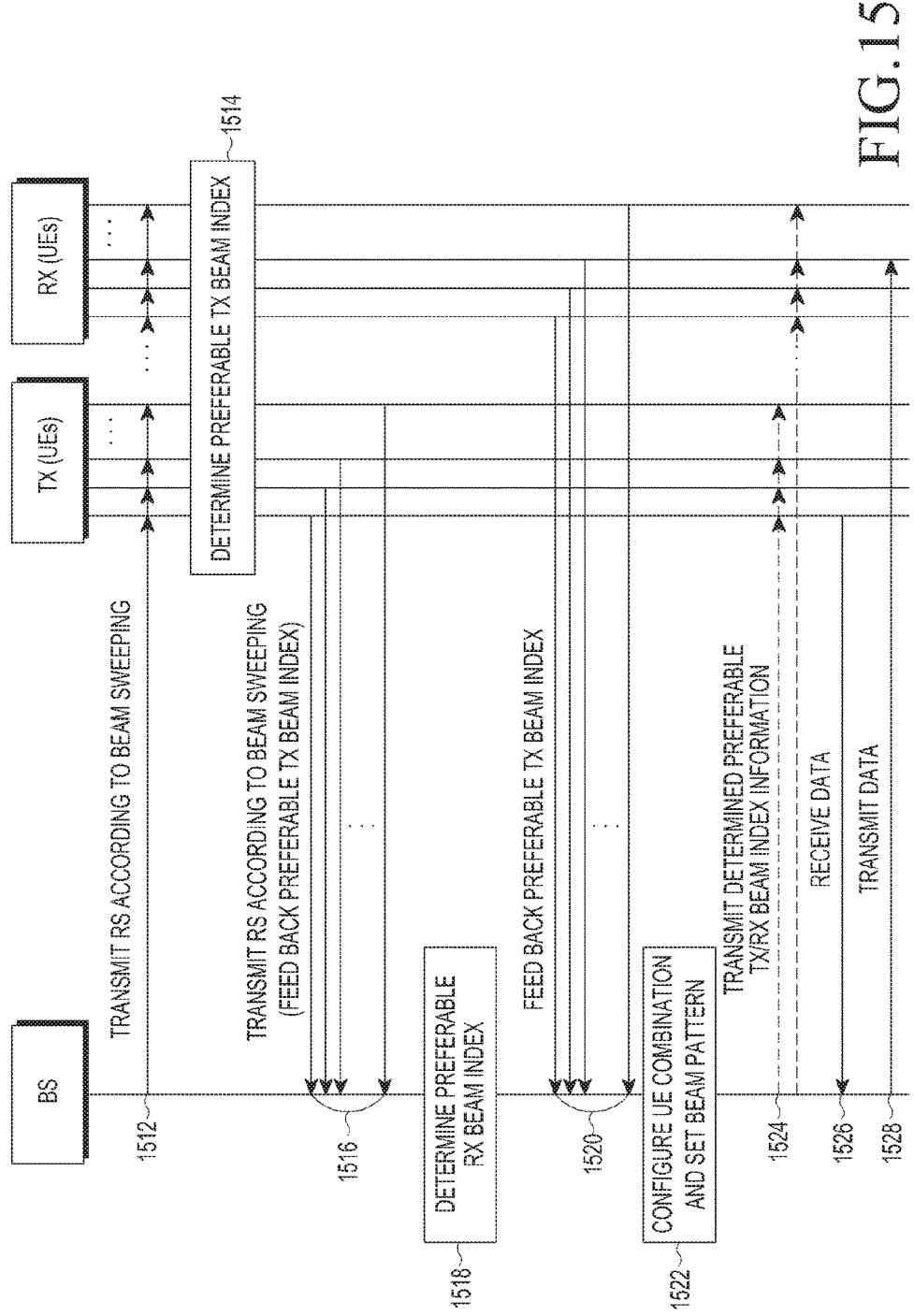
FIG. 15 schematically illustrates an example of a signal processing process according to a process of configuring a UE combination based on IUI and SI and selecting a beam based on a UE combination in a wireless communication system according to various embodiments of the present disclosure.

FIG. 15 schematically illustrates an example of a signal processing process according to a process of configuring a UE combination based on IUI and SI and selecting a beam based on a UE combination in a wireless communication system according to various embodiments of the present disclosure.

Referring to FIG. 15, a BS can generate an SI strength table at operation 1510. That is, the BS can estimate SI strength for each of all combinations which can be configured by total UL Rx beams and total DL Tx beams and generate an SI strength table based on the measured SI strength.

For example, the BS can estimate SI strength while the BS fixes a UL Rx beam, that is, the BS does not change a UL Rx beam index and the BS sweeps a DL Tx beam, that is, the BS changes a DL Tx beam index. The BS can measure SI strength while fixing the next UL Rx beam and sweeping a DL Tx beam. By repetitively performing the described operation, the BS can SI strength for each of combinations of total UL Rx beams and total DL Tx beams. The BS can generate an SI strength table when the BS is initially deployed, and update the SI strength table upon setting a new interval by considering change of a channel environment.

The BS can sequentially total Tx beams according to beam sweeping, and transmit an RS to UEs including Tx UEs and Rx UEs through the selected DL Tx beam at operation 1512.

The UEs can estimate received power at each DL based on RSs received through a plurality of DLs and determine one preferable DL based on received power measured per DL at operation 1514.

That is, the UEs can estimate quality per DL based on the RS transmitted by the BS, select one DL based on the estimation, and determine a DL preferable Tx beam index and a DL preferable Rx beam index indicating a DL preferable Tx beam and a DL preferable Tx beam which correspond to the selected one DL. The UEs can estimate quality per DL based on received power of an RS received through a corresponding DL. The received power can be defined as received signal strength of the RS. For example, the UEs can select one DL of which received signal strength is the strongest among the plurality of DLs.

Each of Tx UEs among the UEs can transmit an RS to the BS according to beam sweeping at operation 1516. Each of the Tx UEs can feed back information on the determined DL preferable Tx beam to the BS upon transmitting an RS. The information on the determined DL preferable Tx beam can include a DL preferable Tx beam index. Each of the Tx UEs can feed back received power information as well as the information on the determined DL preferable Tx beam to the BS. The received power information can be configured based on received signal strength measured at a preferable DL.

The BS can estimate quality per UL based on an RS transmitted by each of the Tx UEs, select one UL based on the estimation, and determine a UL preferable Tx beam index and a UL preferable Rx beam index indicating a UL preferable Tx beam and a UL preferable Tx beam which correspond to the selected one UL at operation 1518.

Each of the Rx UEs can feed back information on the determined DL preferable Tx beam to the BS at predetermined time at operation 1520. The information on the DL preferable Tx beam can include a DL preferable Tx beam index. Each of the Rx UEs can feed back received power information as well as the information on the DL preferable Tx beam to the BS. The received power information can be configured based on received signal strength measured at a preferable DL.

The BS can configure at least one UE combination based on preferable beam information and set a beam pattern based on the configured at least one UE combination at operation 1522. The preferable beam information can include DL preferable Tx beam indexes collected per UE and UL preferable Rx beam indexes determined per Tx UE. The BS can further consider received power information reported by the Tx UEs and/or the Rx UEs upon setting the beam pattern.

For example, the BS can effectively manage IUI and SI by considering preferable beam information and an SI strength table and configure a UE combination thereby maximizing a system performance. Further, the BS can finally select a UE combination of which SI is the smallest among UE combinations in which an angle and a distance which correspond to a Tx UE and an Rx UE predicted based on an SI strength table and preferable beam information satisfy a preset threshold value.

The BS can receive data transmitted by the Tx UEs or transmit data to the Rx UEs based on beam forming which is based on the set beam pattern at operations 1526 and 1528.

The BS can receive a plurality of DL preferable Tx beam indexes from an Rx UE. In this case, the BS can select one of the plurality of DL preferable Tx beam indexes fed back from the Rx UE, and feed back information about the selected DL preferable Tx beam to the Rx UE at operation 1524. The information about the selected DL preferable Tx beam can include a DL preferable Tx beam index allocated to the Rx UE.

The BS can feed back information about UL preferable Rx beam for Tx UEs to the Tx UEs at operation 1524. The information about UL preferable Rx beam can include a UL Rx beam index which the BS selects for the Tx UEs.

Although not shown in FIG. 15, a plurality DL preferable Tx beam indexes can be fed back from an Rx UE. In this case, the BS can select one of the plurality of DL preferable Tx beam indexes fed back from the Rx UE, and feed back information about the selected DL preferable Tx beam index to the Rx UE. The information about the selected DL preferable Tx beam index can include a DL Tx beam index allocated to the Rx UE.

The BS can feed back information about a UL preferable Rx beam for Tx UEs to the Tx UEs. The information about the UL preferable Rx beam can include a UL preferable Rx beam index selected by the BS for the Tx UEs.

An example of a signal processing process according to a process of configuring a UE combination based on IUI and SI and selecting a beam based on a UE combination in a wireless communication system according to various embodiments of the present disclosure has been described with reference to FIG. 15, and an example of a process of transmitting or receiving data based on IUI and SI in a BS in a wireless communication system according to various embodiments of the present disclosure will be described with reference to FIG. 16.

Figure 16:
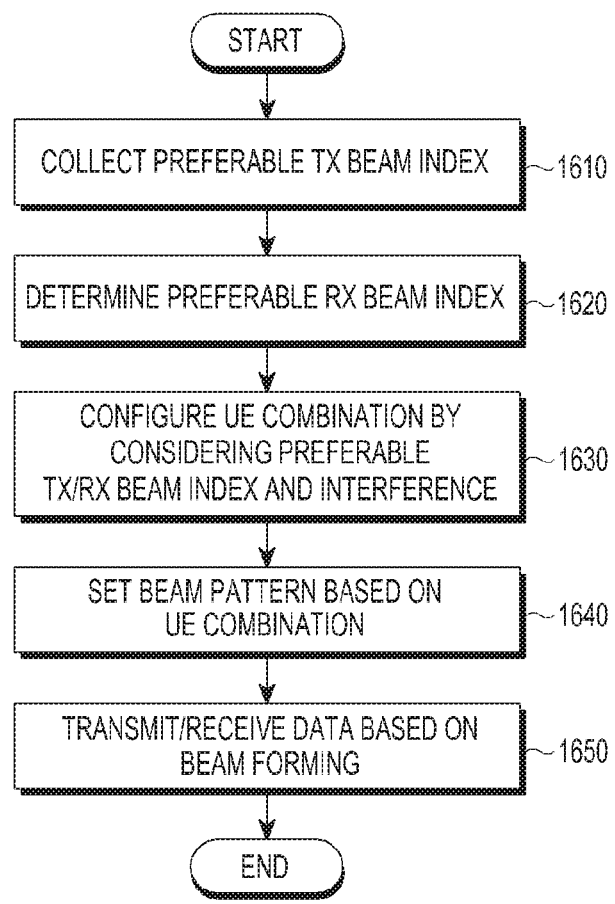
FIG. 16 schematically illustrates an example of a process of transmitting or receiving data based on IUI and SI in a BS in a wireless communication system according to various embodiments of the present disclosure.

FIG. 16 schematically illustrates an example of a process of transmitting or receiving data based on IUI and SI in a BS in a wireless communication system according to various embodiments of the present disclosure.

Referring to FIG. 16, a BS can collect information about a DL preferable Tx beam and/or received power information fed back from each of UEs at operation 1610. For this, the BS can transmit an RS to the UEs according to beam sweeping. That is, the BS can sequentially select total Tx beams which can be formed as a DL, and transmit the RS through the selected DL Tx beam. The received power information fed back from each of the UEs can include received signal strength measured for an RS received through a DL according to the DL preferable Tx beam.

The BS can select a UL preferable Tx beam and/or a UL preferable Rx beam which correspond to each of Tx UEs based on an RS transmitted from each of the Tx UEs according to beam sweeping at operation 1620. The BS can determine a DL preferable Tx beam index and a DL preferable Rx beam index indicating the selected UL preferable Tx beam and UL preferable Rx beam.

The BS can configure at least one UE combination by considering interference such as IUI, SI, and/or the like as well as preferable beam information and/or received power information collected per UE at operation 1630, and set a beam pattern based on the configured at least one UE combination at operation 1640. The BS can generate an SI strength table in advance for considering SI upon determining a UE combination.

The collected preferable beam information can include DL preferable Tx beam indexes fed back from UEs and UL preferable Rx beam indexes determined per Tx UE. An operation for this has been described above, so a detailed description thereof will be omitted herein.

For example, the BS can select UE combinations of which AoAs are greater than or equal to a preset threshold value based on the preferable beam information, and finally select a UE combination of which SI is the smallest among the selected UE combinations. At this time, the selection of the UE combinations needs to be performed based on one DL Rx beam or one UL Tx beam.

For another example, the BS can select UE combinations of which distances from the BS which are predicted by considering preferable beam information and DL received signal strength information are greater than or equal to a preset threshold value, and finally select a UE combination of which SI is the smallest among the selected UE combinations. At this time, the selection of the UE combinations needs to be performed based on one DL Rx beam or one UL Tx beam.

Although FIG. 16 illustrates an example of a process of transmitting or receiving data based on IUI and SI in a BS in a wireless communication system according to various embodiments of the present disclosure, various changes could be made to FIG. 16. For example, although shown as a series of operations, various operations in FIG. 16 could overlap, occur in parallel, occur in a different order, or occur multiple times.

An example of a process of transmitting or receiving data based on IUI and SI in a BS in a wireless communication system according to various embodiments of the present disclosure has been described with reference to FIG. 16, and an example of a process of transmitting or receiving data based on IUI and SI in a UE in a wireless communication system according to various embodiments of the present disclosure will be described with reference to FIG. 17.

Figure 17:
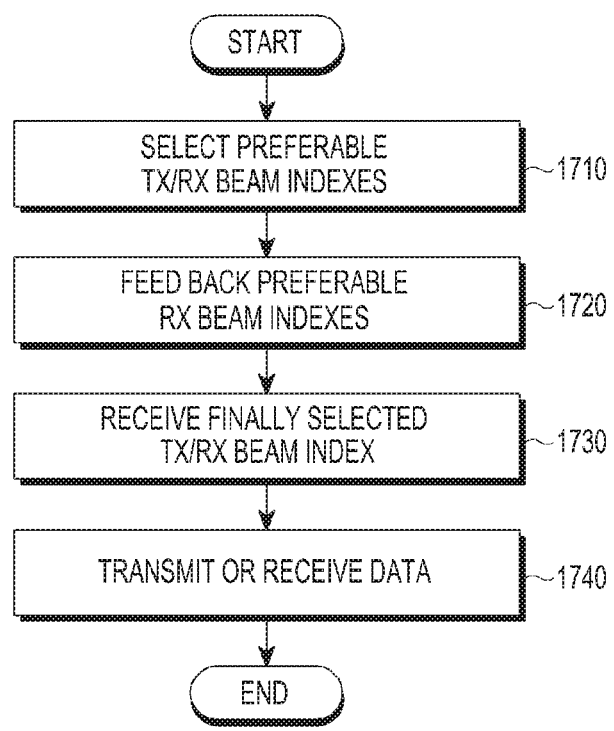
FIG. 17 schematically illustrates an example of a process of transmitting or receiving data based on IUI and SI in a UE in a wireless communication system according to various embodiments of the present disclosure.

FIG. 17 schematically illustrates an example of a process of transmitting or receiving data based on IUI and SI in a UE in a wireless communication system according to various embodiments of the present disclosure.

Referring to FIG. 17, a UE can select M DLs among a plurality of DLs based on RSs received through the plurality of DLs from a BS at operation 1710. Here, M is an integer which is greater than or equal to 2. The UE can acquire DL preferable Tx beam indexes and DL preferable Rx beam indexes which correspond to each of the selected M DLs.

For example, the UE can receive RSs which the BS transmits through the plurality of DLs, and select DLs through which RSs of which quality satisfy a preset level are transmitted among the RSs. The UE can select a Tx beam and an Rx beam forming each of the selected DLs as a DL preferable Tx beam and a DL preferable Rx beam. The UE can acquire DL preferable Tx beam indexes and/or DL preferable Rx beam indexes indicating each of the selected DL preferable Tx beams and/or the selected DL preferable Rx beams.

The UE can feed back information about a DL preferable Tx beam including the acquired M DL preferable Tx beam indexes to the BS at operation 1720. The information about the DL preferable Tx beam can further include a beam index for managing IUI. In a case that the UE is a Tx UE, the UE can transmit an RS to the BS according to beam sweeping upon feeding back the information about the DL preferable Tx beam.

The UE can receive a DL and/or UL Tx beam index and a DL and/or UL Rx beam index from the BS at operation 1730, and transmit data to the BS or receive data from the BS using beams designated by the received DL and/or UL Tx beam index and the received DL and/or UL Rx beam index at operation 1740.

Although FIG. 17 illustrates an example of a process of transmitting or receiving data based on IUI and SI in a UE in a wireless communication system according to various embodiments of the present disclosure, various changes could be made to FIG. 17. For example, although shown as a series of operations, various operations in FIG. 17 could overlap, occur in parallel, occur in a different order, or occur multiple times.

An example of a process of transmitting or receiving data based on IUI and SI in a UE in a wireless communication system according to various embodiments of the present disclosure has been described with reference to FIG. 17, and another example of a process of transmitting or receiving data in a BS in a wireless communication system according to various embodiments of the present disclosure will be described with reference to FIG. 18.

Figure 18:
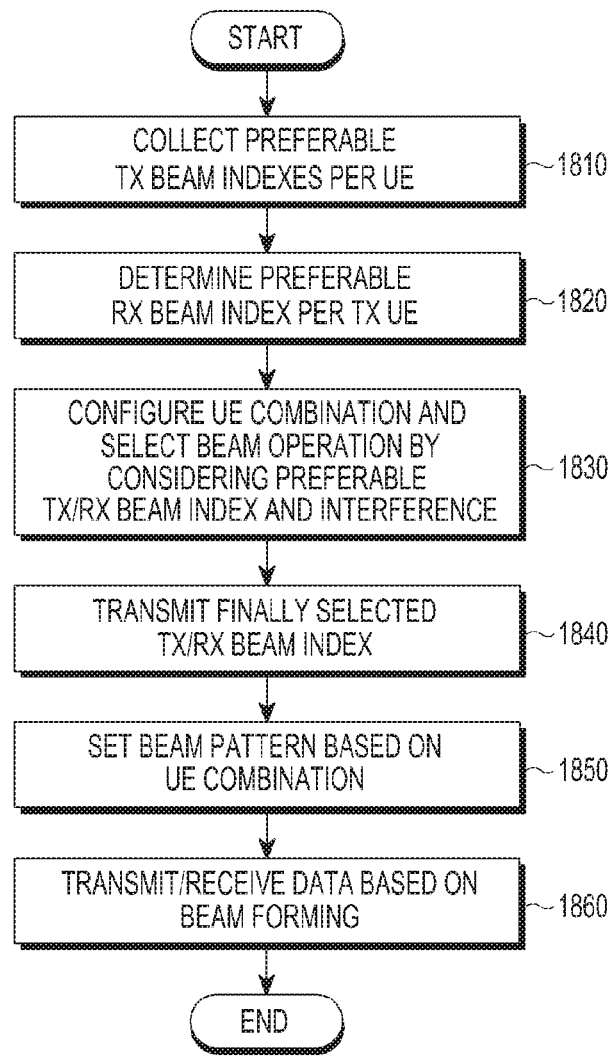
FIG. 18 schematically illustrates another example of a process of transmitting or receiving data in a BS in a wireless communication system according to various embodiments of the present disclosure.

FIG. 18 schematically illustrates another example of a process of transmitting or receiving data in a BS in a wireless communication system according to various embodiments of the present disclosure.

Referring to FIG. 18, a BS can collect M DL preferable Tx beam indexes per UE based on information about a DL preferable Tx beam fed back from each of UEs at operation 1810. The UEs can include all of Tx UEs and Rx UEs.

For this, the BS can transmit an RS to the UEs according to beam sweeping. That is, the BS can sequentially select total Tx beams which can be formed as a DL and transmit the RS through the selected DL Tx beam.

The BS can determine a UL preferable Rx beam index for the Tx UEs at operation 1820. For this, the BS can receive RSs which the Tx UEs transmit according to beam sweeping. The BS can select a UL preferable Tx beam and a UL preferable Rx beam which correspond to each of the Tx UEs based on the RSs transmitted by the Tx UEs, and determine a UL preferable Tx beam index and a UL preferable Rx beam index indicating the selected UL preferable Tx beam and UL preferable Rx beam.

The BS can configure a UE combination by considering IUI and SI based on preferable beam information thereby maximizing a system performance, and perform a beam selecting operation for a Tx UE and an Rx UE configuring the UE combination at operation 1830. The preferable beam information can include M DL preferable Tx beam indexes collected per UE and a UL preferable Rx beam index and a UL preferable Tx beam index determined per Tx UE.

The BS can transmit, to corresponding Tx UEs and Rx UEs, beam index information which is finally selected for a Tx UE and an Rx UE configuring each UE combination based on the beam selecting operation at operation 1840. For example, beam index information to be transmitted to each of Tx UEs can include a UL Tx beam index and a UL Rx beam index, and beam index information to be transmitted to each of Rx UEs can include a DL Tx beam index and a DL Rx beam index.

The BS can set a beam pattern for UE combinations based on beam index information transmitted to the UEs, i.e., the Tx UEs and the Rx UEs at operation 1850. The BS can receive data transmitted by the Tx UEs or transmit data to the Rx UEs using beamforming which is based on the set beam pattern at operation 1860.

Although FIG. 18 illustrates another example of a process of transmitting or receiving data in a BS in a wireless communication system according to various embodiments of the present disclosure, various changes could be made to FIG. 18. For example, although shown as a series of operations, various operations in FIG. 18 could overlap, occur in parallel, occur in a different order, or occur multiple times.

Another example of a process of transmitting or receiving data in a BS in a wireless communication system according to various embodiments of the present disclosure has been described with reference to FIG. 18, and an example of a scenario in a case that a neighbor UE exists in a wireless communication system according to various embodiments of the present disclosure will be described with reference to FIG. 19A.

Figure 19A:
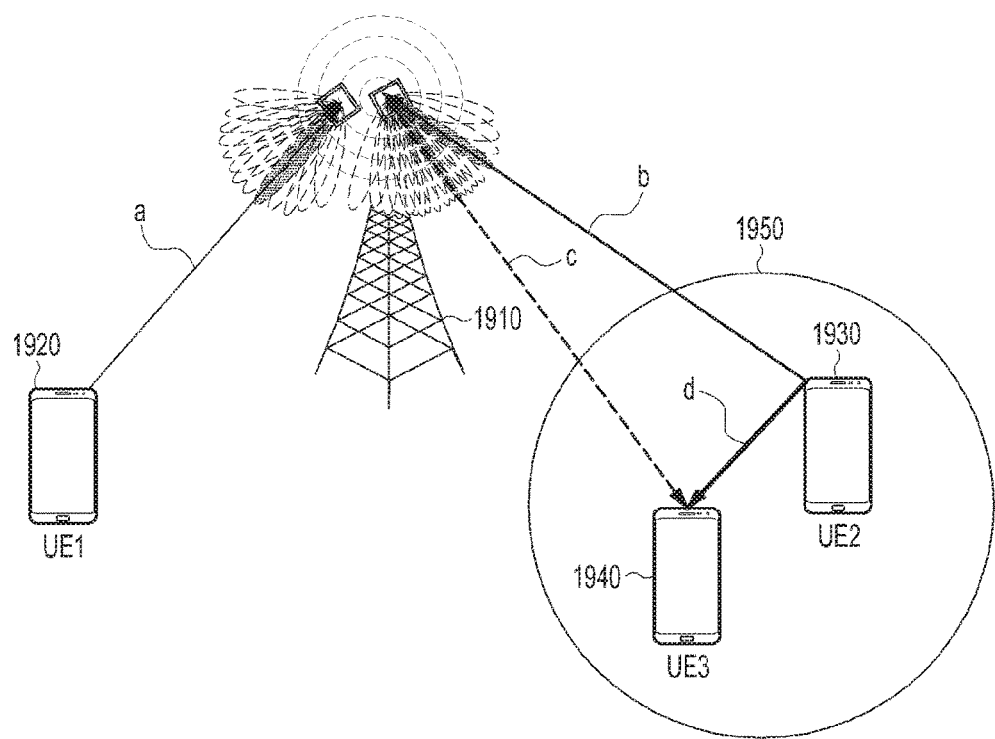
FIG. 19A schematically illustrates an example of a scenario in a case that a neighbor UE exists in a wireless communication system according to various embodiments of the present disclosure.

FIG. 19A schematically illustrates an example of a scenario in a case that a neighbor UE exists in a wireless communication system according to various embodiments of the present disclosure.

Referring to FIG. 19A, a BS 1910 can differently apply to a scheme of configuring a UE combination by considering interference information reported by an Rx UE. The interference information can be information about interference which occurs due to a signal transmitted by a Tx UE which is adjacent to the Rx UE.

For example, it will be assumed that a UE #2 1930 which has data to be transmitted to the BS 1910 through a UL c is located within a service area 1950 of a UE #3 1940 which has data to be received from the BS 1910 through a DL c. In this case, a signal which the UE #2 1930 transmits through a UL b can be operated as interference d to the UE #3 1940.

The UE #3 1940 can measure interference strength due to a Tx signal of the UE #2 1930 by monitoring a resource periodically or aperiodically allocated on a UE. Specially, if the UE #3 1940 supports a D2D communication, the UE #3 1940 can receive a signal transmitted through the UL. So, the UE #3 1940 can measure interference strength due to the UE #2 1930 by monitoring a general UL interval, not a D2D interval.

The UE #3 1940 can feed back information about the measured interference to the BS 1910. The UE #3 1940 can feed back only information about interference strength or information indicating whether there is interference.

The BS 1910 can configure a UE combination using the information about the interference as well as preferable beam information. For example, the BS 1910 can configure candidate UE combinations based on the preferable beam information and select a final UE combination among the candidate UE combinations based on the information about the interference. That is, for a UE for which a neighbor UE exists and of which interference effect due to the neighbor UE is large, the BS 1910 can configure a UE combination based on preferable beam information.

An example of a scenario in a case that a neighbor UE exists in a wireless communication system according to various embodiments of the present disclosure has been described with reference to FIG. 19A, and an example of a scenario in a case that a neighbor UE does not exist in a wireless communication system according to various embodiments of the present disclosure will be described with reference to FIG. 19B.

Figure 19B:
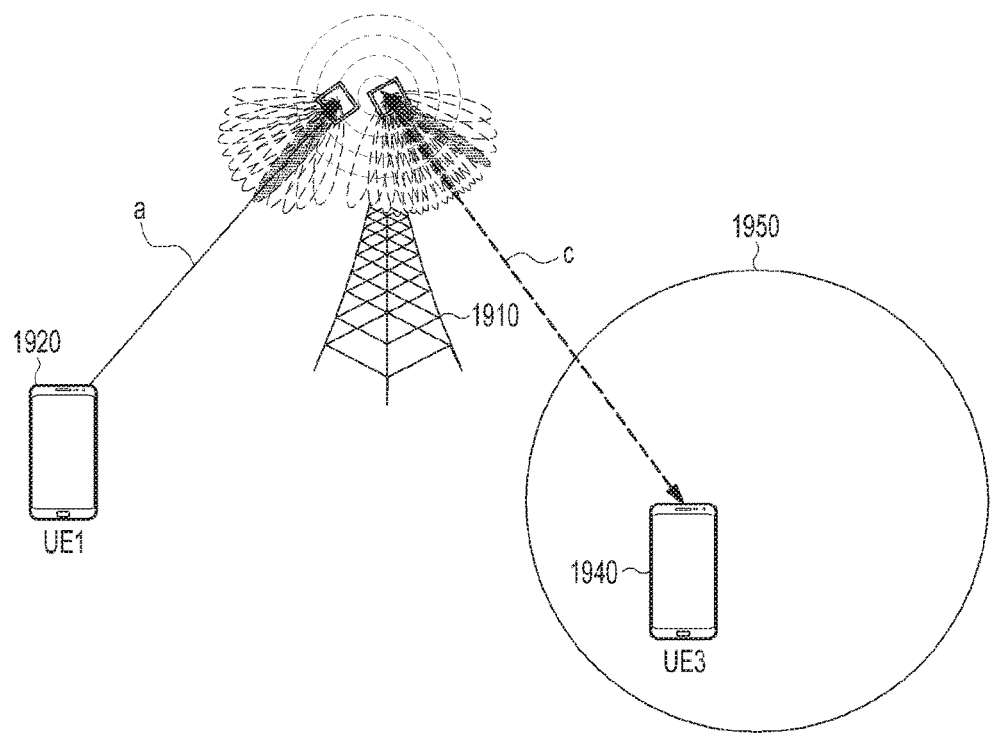
FIG. 19B schematically illustrates an example of a scenario in a case that a neighbor UE does not exist in a wireless communication system according to various embodiments of the present disclosure.

FIG. 19B schematically illustrates an example of a scenario in a case that a neighbor UE does not exist in a wireless communication system according to various embodiments of the present disclosure.

Referring to FIG. 19B, a BS 1910 can differently apply to a scheme of configuring a UE combination based on interference information reported by an Rx UE. The interference information can be information about interference which occurs due to effect of a signal transmitted by a Tx UE which is adjacent to the Rx UE.

For example, it will be assumed that a UE which has data to be transmitted to the BS 1910 does not exist within a service area 1950 of a UE #3 1940 which has data to be received from the BS 1910 through a DL c. In this case, it will be noted that interference which affects the UE #3 1940 does not exist.

The UE #3 1940 can measure interference strength by periodically or aperiodically monitoring a resource allocated to a UL. However, there is not neighbor UE, so very small interference strength will be measured by the UE #3 1940.

The UE #3 1940 can feed back information about measured interference to the BS 1910. The UE #3 1940 can feed back interference strength or information indicating whether there is interference.

The BS 1910 can determine whether to configure a UE combination based on preferable beam information based on information about the interference. That is, the BS 1910 can randomly designate a target Tx UE which will be configured as a UE combination with the UE #3 1940 if interference strength of the UE #3 1940 is very small or interference for the UE #3 1940 does not exist. That is, a UE of which interference strength is very small or for which interference does not exist can be configured as a UE combination with an arbitrary Tx UE regardless of preferable beam information.

As described above, the BS 1910 can determine whether to consider preferable beam information upon selecting a Tx UE which will be configured as a UE combination with a specific Rx UE according to a degree of interference of the specific Rx UE. The proposed scheme can provide flexibility of scheduling for resource allocation.

According to an embodiment of the present disclosure, a method of acquiring IUI management information using a device discovery function of a D2D scheme can consider the following four schemes.

A scheme #1 is a scheme of allocating an orthogonal resource for measuring interference due to a neighbor UE on a DL on a physical random access channel (PRACH) interval, and monitoring UL power of the neighbor UE on the orthogonal resource allocated on the PRACH interval. A PRACH can be used for UL synchronization and UL resource allocation. Specially, the PRACH can be mainly used for pre-work for controlling a UL and transmitting data.

A scheme #2 is a scheme of allocating an orthogonal resource for measuring interference due to a neighbor UE on a DL, and monitoring UL power of the neighbor UE on the allocated orthogonal resource. In this case, only a UE using the allocated resource can be discovered, and the scheme #2 can be applied to a case that a BS monitors a specific frequency for allocating the specific frequency.

A scheme #3 is a scheme of allocating an orthogonal resource for measuring interference due to a neighbor UE on a DL on a physical uplink control channel (PUCCH) interval, and monitoring UL power of the neighbor UE on the orthogonal resource allocated on the PUCCH interval. A PUCCH can be used for transmitting channel quality information (CQI), a precoding matrix indicator (PMI), a rank indicator (RI), and ACK/NACK information. That is, most signals transmitted through the PUCCH correspond to information for DL transmission or response to DL transmission. However, a signal transmitted through the PUCCH can operate as potential IUI.

A scheme #4 is a scheme of allocating an orthogonal resource for measuring interference due to a neighbor UE on a DL on a sounding reference signal (SRS) interval, and monitoring UL power of the neighbor UE on the orthogonal resource allocated on the SRS interval.

Like in the scheme #3, the scheme #4 is used for detecting a channel state of an Rx UE, so it can be difficult to detect a Tx UE in the scheme #4. However, the scheme #4 has a possibility that affects potential IUI.

Like in the scheme #1, a UE determines interference strength or whether interference exists by monitoring a PRACH interval and feeds back the determined result to a BS, so the BS can use corresponding information for configuring a UE combination. In this case, the scheme #3 and the scheme #4 can be used if scheduling is performed by considering an potential Tx UE. For example, the scheme #3 and the scheme #4 can be used for supplementing the scheme #1.

An example of a signal processing process according to a process of selecting a beam by considering interference due to a neighbor UE in a wireless communication system according to various embodiments of the present disclosure will be described with reference to FIG. 20.

Figure 20:
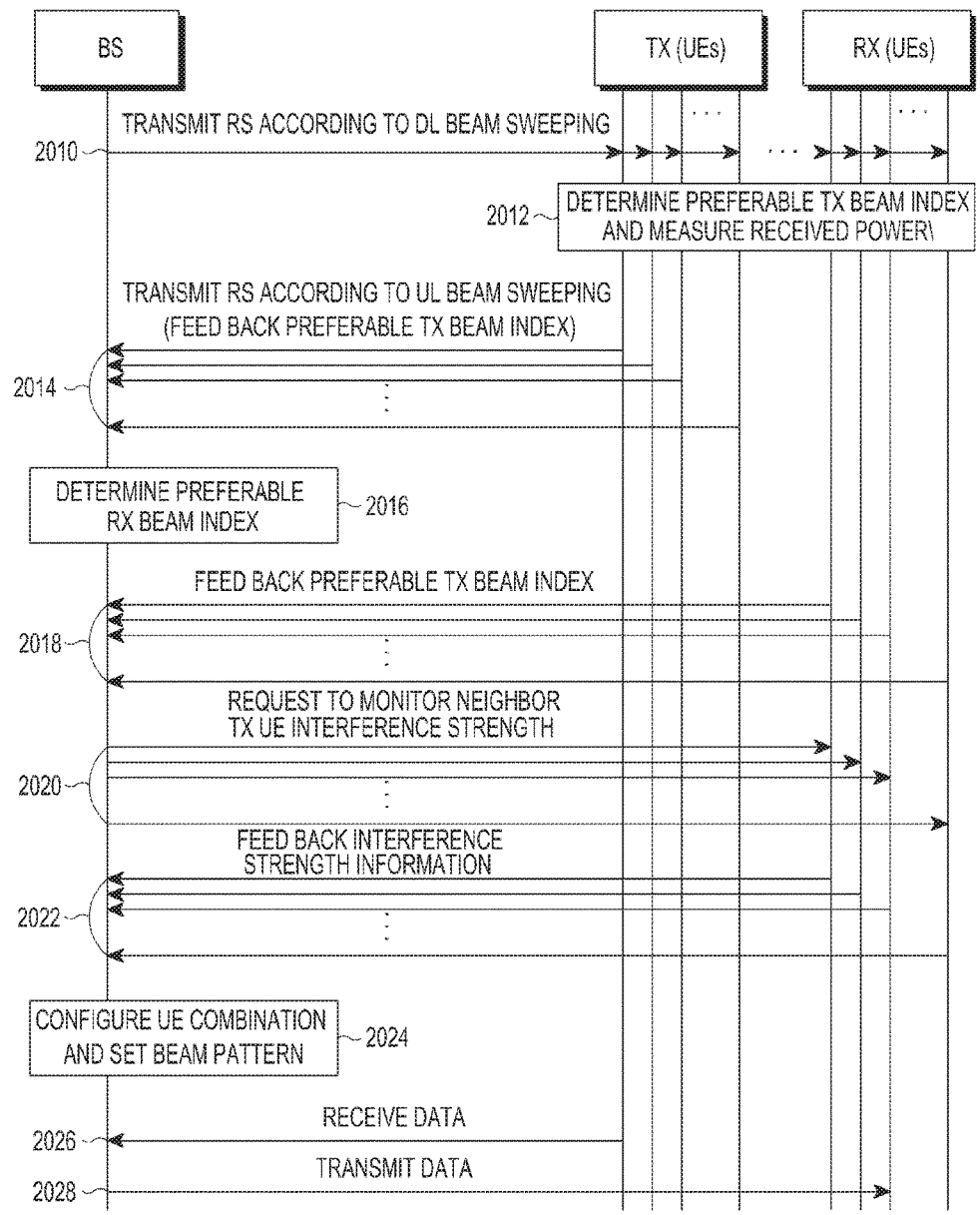
FIG. 20 schematically illustrates an example of a signal processing process according to a process of selecting a beam by considering interference due to a neighbor UE in a wireless communication system according to various embodiments of the present disclosure.

FIG. 20 schematically illustrates an example of a signal processing process according to a process of selecting a beam by considering interference due to a neighbor UE in a wireless communication system according to various embodiments of the present disclosure.

Referring to FIG. 20, a BS can sequentially select total Tx beams according to beam sweeping, and transmit an RS to UEs including Tx UEs and Rx UEs through the selected DL Tx beam at operation 2010.

The UEs can measure received power on each DL based on RSs received through a plurality of DLs and determine one preferable DL based on received power measured per DL at operation 2012. That is, the UEs can estimate quality per DL based on the RS transmitted by the BS and select one DL based on the estimation. The UEs can determine a DL preferable Tx beam index and a DL preferable Rx beam index indicating a DL preferable Tx beam and a DL preferable Rx beam which correspond to a selected one DL. The UEs can estimate quality per DL based on received power of an RS received through a DL. The received power can be defined as received signal strength of an RS. For example, the UEs can select one DL of which received signal strength is the strongest among the plurality of DLs.

Tx UEs among the UEs can transmit RSs to the BS according to beam sweeping at operation 2014. Each of the Tx UEs can feed back information about the determined DL preferable Tx beam upon transmitting the RS. The information about the determined DL preferable Tx beam can include a DL preferable Tx beam index. Each of the Tx UEs can feed back received power information as well as the information about the DL preferable Tx beam to the BS. The received power information can be configured based on received signal strength measured through a preferable DL.

The BS can estimate quality per UL based on RSs transmitted by the Tx UEs, select one UL based on the estimation, and determine a UL preferable Tx beam index and a UL preferable Rx beam index indicating a UL preferable Tx beam and a UL preferable Rx beam which correspond to the selected one UL at operation 2016.

Each of the Rx UEs can feed back information about the determined DL preferable Tx beam at predetermined time at operation 2018. The information about the determined DL preferable Tx beam can include a DL preferable Tx beam index. Each of the Rx UEs can feed back received power information as well as the information about the determined DL preferable Tx beam to the BS. The received power information can be configured based on received signal strength measured through a preferable DL.

The BS can request the Rx UEs to report information about interference due to a neighbor Tx UE at operation 2020. At this time, the BS can designate a period of monitoring interference strength to the Rx UEs.

Each of the Rx UEs can measure interference strength due to a Tx signal of a neighbor Tx UE in response to the request of the BS and report information about the measured interference to the BS at operation 2022. The information about the measured interference can include information indicating measured interference strength or information whether interference exists.

The BS can determine whether there is a neighbor Tx UE which operates as interference to an Rx UE based on the information fed back from each of the Rx UEs and determine whether it is necessary to consider preferable beam information for configuring a UE combination based on the determined result at operation 2024. For example, the BS can select a Tx UE which will be configured as a UE combination with an Rx UE for which a neighbor Tx UE exists based on preferable beam information, and randomly select a Tx UE which will be configured as a UE combination with an Rx UE for which a neighbor Tx UE does not exist regardless of the preferable beam information. The BS can set a beam pattern using the configured UE combinations.

The BS can receive data transmitted by Tx UEs and transmit data to Rx UEs based on beamforming which is based on the set beam pattern at operations 2026 and 2028.

Although not sown in FIG. 20, a plurality of DL preferable Tx beam indexes can be fed back from an Rx UE. In this case, the BS can select one of the plurality of DL preferable Tx beam indexes fed back by the Rx UE and feed back information about the selected DL preferable Tx beam. The information about the selected DL preferable Tx beam can include a DL Tx beam index allocated for the Rx UE.

The BS can feedback, to Tx UEs, information about a UL preferable Rx beam for the Tx UEs. The information about the UL preferable Rx beam can include a UL Rx beam index which the BS selects for the Tx UEs.

An example of a signal processing process according to a process of selecting a beam by considering interference due to a neighbor UE in a wireless communication system according to various embodiments of the present disclosure has been described with reference to FIG. 20, and an example of an operating process of a UE in a wireless communication system according to various embodiments of the present disclosure will be described with reference to FIG. 21.

Figure 21:
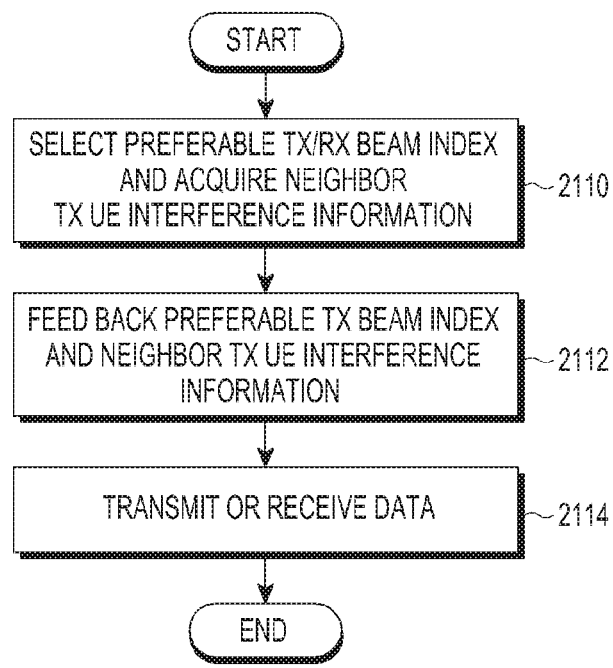
FIG. 21 schematically illustrates an example of an operating process of a UE in a wireless communication system according to various embodiments of the present disclosure.

FIG. 21 schematically illustrates an example of an operating process of a UE in a wireless communication system according to various embodiments of the present disclosure.

Referring to FIG. 21, a UE can select a DL preferable Tx beam index and a DL preferable Rx beam index which correspond to one or more DLs and acquire neighbor Tx UE interference information at operation 2110. For example, the UE can acquire interference information for a neighbor Tx UE by periodically monitoring a PRACH.

The UE can feed back the DL preferable Tx beam index, the DL preferable Rx beam index, and the neighbor Tx UE interference information to the BS at operation 2112.

The UE can receive a DL and/or UL Tx beam index and a DL and/or UL Rx beam index from the BS, and transmit data to the BS or receive data from the BS using beams designated by the received DL and/or UL Tx beam index and the received DL and/or UL Rx beam index at operation 2114.

An example of an operating process of a UE in a wireless communication system according to various embodiments of the present disclosure has been described with reference to FIG. 21, and an example of an operating process of a BS in a wireless communication system according to various embodiments of the present disclosure will be described with reference to FIG. 22.

Figure 22:
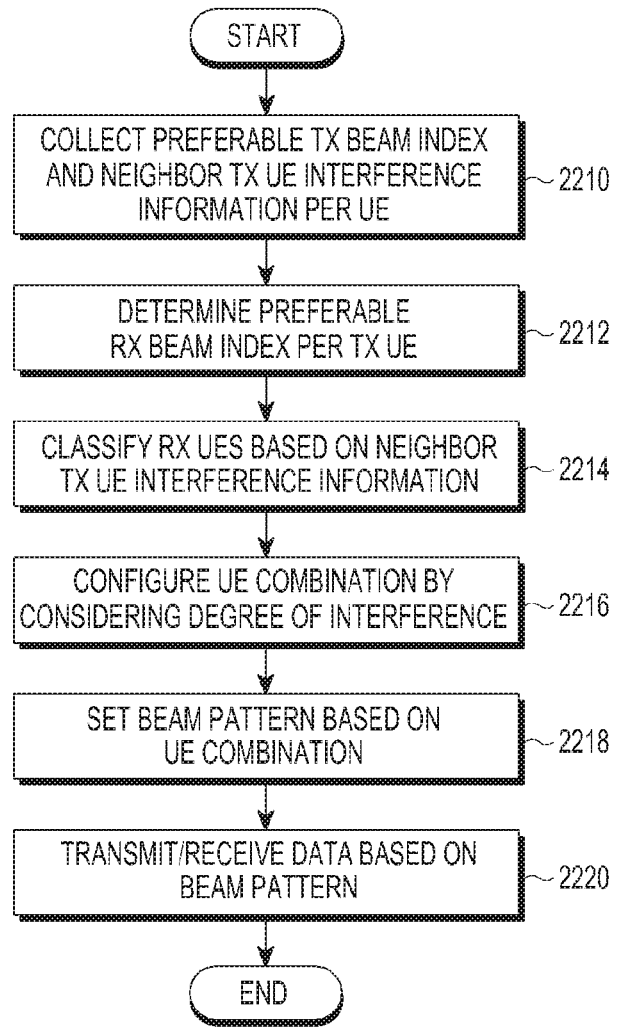
FIG. 22 schematically illustrates an example of an operating process of a BS in a wireless communication system according to various embodiments of the present disclosure.

FIG. 22 schematically illustrates an example of an operating process of a BS in a wireless communication system according to various embodiments of the present disclosure.

Referring to FIG. 22, a BS can collect information on a DL preferable Tx beam and neighbor Tx UE interference information fed back from each of UEs at operation 2210. The neighbor Tx UE interference information fed back from the each of UEs can include information indicating interference strength due to a neighbor Tx UE or whether interference due to the neighbor Tx UE occurs.

The BS can determine a UL preferable Tx beam index and/or a UL preferable Rx beam index which correspond to each of the Tx UEs based on RSs transmitted from the Tx UEs according to beam sweeping at operation 2212.

The BS can classify Rx UEs based on the neighbor Tx UE interference information at operation 2214. For example, the BS can classify the Rx UEs into Rx UEs for which interference effect due to a neighbor Tx UE is large and Rx UEs for which the interference effect due to the neighbor Tx UE is small based on the neighbor Tx UE interference information.

The BS can configure a UE combination according to a scheme which is differently set per Rx UE which is classified by considering a degree of interference effect at operation 2216. For example, the BS can select a Tx UE which will be configured as a UE combination with Rx UEs for which interference effect is large based on the preferable beam information. The BS can randomly select a Tx UE which will be configured as a UE combination with Rx UEs for which interference effect is small without considering the preferable beam information.

The BS can set a beam pattern based on UE combinations at operation 2228, and receive data transmitted Tx UEs or transmit data to Rx UEs based on a beamforming operation which is based on the set beam pattern at operation 2230.

An example of an operating process of a BS in a wireless communication system according to various embodiments of the present disclosure has been described with reference to FIG. 22, and another example of an operating process of a BS in a wireless communication system according to various embodiments of the present disclosure will be described with reference to FIG. 23.

Figure 23:
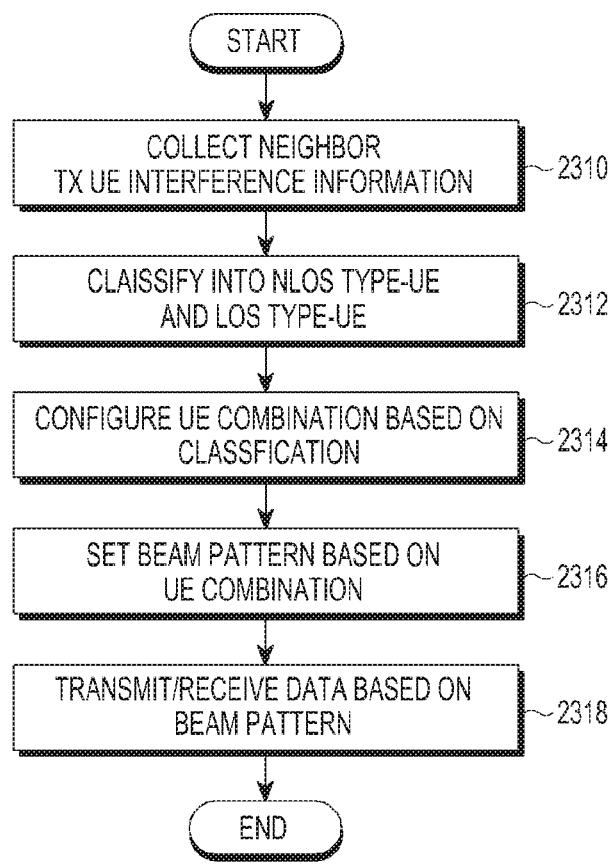
FIG. 23 schematically illustrates another example of an operating process of a BS in a wireless communication system according to various embodiments of the present disclosure.

FIG. 23 schematically illustrates another example of an operating process of a BS in a wireless communication system according to various embodiments of the present disclosure.

Referring to FIG. 23, a BS can collect neighbor Tx UE interference information fed back from each of UEs at operation 2310. The neighbor Tx UE interference information fed back from the each of UEs can include information indicating interference strength due to a neighbor Tx UE or whether interference due to the neighbor Tx UE occurs.

The BS can classify the UEs into NLoS type-UEs and LoS type-UEs based on DL received signal strength, UL received signal strength, and/or the like according to the neighbor Tx UE interference information at operation 2312.

The BS can configure a UE combination based on a scheme which is differentiated for the NLoS type-UEs and the LoS type-UEs at operation 2314. For example, the BS can configure the NLoS type-UEs and a UE for which interference of a neighbor UE does not exist as a UE combination. The BS can select the LoS type-UEs as an arbitrary UE without considering interference due to a neighbor UE.

The BS can set a beam pattern based on UE combinations at operation 2316, and receive data transmitted by Tx UEs or transmit data to Rx UEs based on a beamforming operation which is based on the set beam pattern at operation 2318.

Another example of an operating process of a BS in a wireless communication system according to various embodiments of the present disclosure has been described with reference to FIG. 23, and still another example of an operating process of a BS in a wireless communication system according to various embodiments of the present disclosure will be described with reference to FIG. 24.

Figure 24:
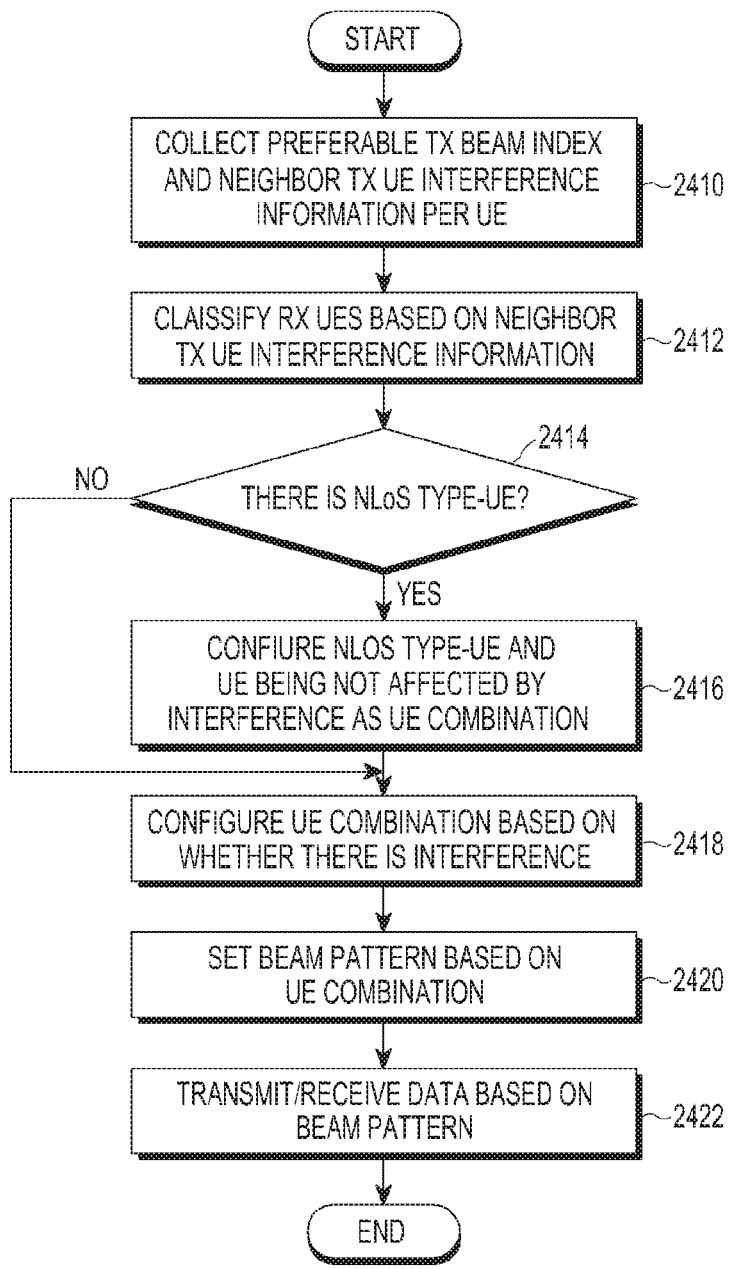
FIG. 24 schematically illustrates still another example of an operating process of a BS in a wireless communication system according to various embodiments of the present disclosure.

FIG. 24 schematically illustrates still another example of an operating process of a BS in a wireless communication system according to various embodiments of the present disclosure.

Referring to FIG. 24, a BS can collect information on a DL preferable Tx beam and neighbor Tx UE interference information fed back from each of UEs at operation 2410. The BS can classify Rx UEs based on the neighbor Tx UE interference information at operation 2412. For example, the BS can classify the Rx UEs into Rx UEs for which interference effect due to a neighbor Tx UE is large and Rx UEs for which the interference effect due to the neighbor Tx UE is small based on the neighbor Tx UE interference information.

The BS can determine whether an NLoS type-UE exists based on DL received signal strength, UL received signal strength, and/or the like according to the neighbor Tx UE interference information at operation 2414.

If the NLoS type-UE exists, the BS can configure a UE for which neighbor interference does not exist and the NLoS type-UE as a UE combination at operation 2416.

If the configuration of the UE combination for the NLoS type-UE has been completed, the BS can configure a UE combination for remaining UEs based on preferable beam information at operation 2418. The configuration of the UE combination which is based on the preferable beam information has been described above, so a detailed description thereof will be omitted herein.

If the NLoS type-UE does not exist, the BS can configure a UE combination according to a scheme which is differently set per Rx UE which is classified by considering a degree of interference effect at operation 2418. For example, the BS can select a Tx UE which will be configured as a UE combination with Rx UEs for which interference effect is large based on the preferable beam information. The BS can randomly select a Tx UE which will be configured as a UE combination with Rx UEs for which interference effect is small without considering the preferable beam information.

The BS can set a beam pattern by UE combinations at operation 2420, and receive data transmitted Tx UEs or transmit data to Rx UEs based on a beamforming operation which is based on the set beam pattern at operation 2422.

Although FIGS. 22 to 24 illustrate examples of an operating process of a BS in a wireless communication system according to various embodiments of the present disclosure, various changes could be made to FIGS. 22 to 24. For example, although shown as a series of operations, various operations in FIGS. 22 to 24 could overlap, occur in parallel, occur in a different order, or occur multiple times.

In accordance with various embodiments of the present disclosure, a BS in a wireless communication system supporting a full-duplex scheme is provided. The BS includes a processing module configured to acquire reference information for allocating a resource, to determine at least one combination to which an antenna beam will be allocated among candidate UE combinations which are configurable by at least one Tx UE and at least one Rx UE based on the acquired reference information, and to allocate a Tx antenna beam and an Rx antenna beam for a Tx UE and an Rx UE included in the at least one UE combination; and a communication module configured to transmit a signal to the Tx UE included in the at least one UE combination based on the Tx antenna beam allocated by the processing module, and to receive a signal from the Rx UE included in the at least one UE combination based on the Rx antenna beam allocated by the processing module, wherein the reference information includes Tx antenna beam identification information indicating a Tx antenna beam which is requested by each of the at least one Tx UE and Rx antenna beam identification information indicating an Rx antenna beam which is requested by each of the at least one Rx UE.

Preferably, the processing module is configured to determine the at least one UE combination based on at least one Tx antenna beam indicated by the Tx antenna beam identification information and interference amount predicted by at least one Rx antenna beam indicated by the Rx antenna beam identification information.

Preferably, the processing module is configured to acquire an included angle at each of the candidate UE combinations corresponding to a combination of at least one Tx antenna beam indicated by the Tx antenna beam identification information and at least one Rx antenna beam indicated by the Rx antenna beam identification information, and to select the at least one UE combination based on the included angle acquired at each of the candidate UE combinations.

Preferably, the at least one UE combination includes a combination for which an included angle is maximum among the candidate UE combinations.

Preferably, the processing module is configured to select a candidate UE combination for which an included angle is greater than a preset threshold value among included angles acquired at the candidate UE combinations as the at least one UE combination.

Preferably, if there are plurality of candidate UE combinations for which included angles are greater than a preset threshold value among the included angles acquired at the candidate UE combinations and there are a plurality of candidate UE combinations in which at least one of a Tx UE and an Rx UE is overlapped among the plurality of candidate UE combinations, the processing module is configured to select one candidate UE combination based on received signal strength in an Rx UE from among the plurality of candidate UE combinations in which the at least one of the Tx UE and the Rx UE is overlapped.

Preferably, the processing module is configured to additionally consider remaining SI upon determining the at least one UE combination to which the antenna beam will be allocated.

Preferably, if there are plurality of candidate UE combinations for which included angles are greater than a preset threshold value among the included angles acquired at the candidate UE combinations and there are a plurality of candidate UE combinations in which at least one of a Tx UE and an Rx UE is overlapped among the plurality of candidate UE combinations, the processing module is configured to select one candidate UE combination with minimum remaining SI from among the plurality of candidate UE combinations in which the at least one of the Tx UE and the Rx UE is overlapped.

In accordance with various embodiments of the present disclosure, an operating method of a BS in a wireless communication system supporting a full-duplex scheme is provided. The operating method includes acquiring reference information for allocating a resource; determining at least one combination to which an antenna beam will be allocated among candidate UE combinations which are configurable by at least one Tx UE and at least one Rx UE based on the acquired reference information; allocating a Tx antenna beam and an Rx antenna beam for a Tx UE and an Rx UE included in the at least one UE combination; transmitting a signal to the Tx UE included in the at least one UE combination based on the allocated Tx antenna beam; and receiving a signal from the Rx UE included in the at least one UE combination based on the allocated Rx antenna beam, wherein the reference information includes Tx antenna beam identification information indicating a Tx antenna beam which is requested by each of the at least one Tx UE and Rx antenna beam identification information indicating an Rx antenna beam which is requested by each of the at least one Rx UE.

Preferably, the determining the at least one UE combination comprises determining the at least one UE combination based on at least one Tx antenna beam indicated by the Tx antenna beam identification information and interference amount predicted by at least one Rx antenna beam indicated by the Rx antenna beam identification information.

Preferably, the determining the at least one UE combination comprises: acquiring an included angle at each of the candidate UE combinations corresponding to a combination of at least one Tx antenna beam indicated by the Tx antenna beam identification information and at least one Rx antenna beam indicated by the Rx antenna beam identification information; and selecting the at least one UE combination based on the included angle acquired at each of the candidate UE combinations.

Preferably, the at least one UE combination includes a combination for which an included angle is maximum among the candidate UE combinations.

Preferably, the determining the at least one UE combination comprises selecting a candidate UE combination for which an included angle is greater than a preset threshold value among included angles acquired at the candidate UE combinations as the at least one UE combination.

Preferably, if there are plurality of candidate UE combinations for which included angles are greater than a preset threshold value among the included angles acquired at the candidate UE combinations and there are a plurality of candidate UE combinations in which at least one of a Tx UE and an Rx UE is overlapped among the plurality of candidate UE combinations, one candidate UE combination is selected based on received signal strength in an Rx UE from among the plurality of candidate UE combinations in which the at least one of the Tx UE and the Rx UE is overlapped.

Preferably, the determining the at least one UE combination to which the antenna beam will be allocated comprises determining the at least one UE combination by additionally considering remaining SI.

Preferably, if there are plurality of candidate UE combinations for which included angles are greater than a preset threshold value among the included angles acquired at the candidate UE combinations and there are a plurality of candidate UE combinations in which at least one of a Tx UE and an Rx UE is overlapped among the plurality of candidate UE combinations, one candidate UE combination with minimum remaining SI is selected from among the plurality of candidate UE combinations in which the at least one of the Tx UE and the Rx UE is overlapped.

Various embodiments proposed in the present disclosure configure a combination of a Tx UE and an Rx UE based on a beamforming index in order that IUI is decreased, thereby effectively decreasing IUI effect in a full-duplex system. In this case, Tx efficiency of a full-duplex system can be increased.

According to various embodiments proposed in the present disclosure, a Tx UE and an Rx UE are paired by considering IUI and SI at the same time and a beam index is selected by considering this, thereby maximizing a system performance.

As is apparent from the foregoing description, an embodiment of the present disclosure enables to perform a beamforming operation for decreasing interference due to at least one of IUI and SI in a full-duplex system.

An embodiment of the present disclosure enables to configure UEs as a UL/DL combination based on IUI and allocate a wireless resource based on the configured UL/UL combination thereby increasing Tx efficiency in a full-duplex system.

An embodiment of the present disclosure enables to configure UEs as a combination of a Tx UE and an Rx UE based on beamforming indexes which the UEs request to allocate in a full-duplex system.

An embodiment of the present disclosure enables to allocate a wireless resource for a Tx/Rx antenna beam according to beamforming based on interference management in a full-duplex system.

An embodiment of the present disclosure enables to set a Tx antenna beam and an Rx antenna beam which will share a wireless resource as one combination and allocate a wireless resource thereby one wireless resource is shared in the Tx antenna beam and the Rx antenna beam set as the one combination in a full-duplex system.

Certain aspects of the present disclosure can also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), CD-ROMs, magnetic tapes, floppy disks, optical data storage devices, and carrier waves (such as data transmission through the Internet). The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

It can be appreciated that a method and apparatus according to an embodiment of the present disclosure can be implemented by hardware, software and/or a combination thereof. The software can be stored in a non-volatile storage, for example, an erasable or re-writable ROM, a memory, for example, a RAM, a memory chip, a memory device, or a memory integrated circuit (IC), or an optically or magnetically recordable non-transitory machine-readable (e.g., computer-readable), storage medium (e.g., a compact disk (CD), a digital video disc (DVD), a magnetic disk, a magnetic tape, and/or the like). A method and apparatus according to an embodiment of the present disclosure can be implemented by a computer or a mobile terminal that includes a controller and a memory, and the memory can be an example of a non-transitory machine-readable (e.g., computer-readable), storage medium suitable to store a program or programs including instructions for implementing various embodiments of the present disclosure.

The present disclosure can include a program including code for implementing the apparatus and method as defined by the appended claims, and a non-transitory machine-readable (e.g., computer-readable), storage medium storing the program. The program can be electronically transferred via any media, such as communication signals, which are transmitted through wired and/or wireless connections, and the present disclosure can include their equivalents.

An apparatus according to an embodiment of the present disclosure can receive the program from a program providing device which is connected to the apparatus via a wire or a wireless and store the program. The program providing device can include a memory for storing instructions which instruct to perform a content protect method which has been already installed, information necessary for the content protect method, and the like, a communication unit for performing a wired or a wireless communication with a graphic processing device, and a controller for transmitting a related program to a transmitting/receiving device based on a request of the graphic processing device or automatically transmitting the related program to the transmitting/receiving device.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for performing a beamforming operation, by a base station, in a wireless communication system supporting a full-duplex scheme, the method comprising:
   acquiring reference information for allocating a resource;
   determining, based on the acquired reference information, a user equipment (UE) combination of a transmission (Tx) UE and a reception (Rx) UE which is capable of sharing a resource from combinations of at least one Tx UE and at least one Rx UE; and
   allocating a Tx antenna beam for the Tx UE of the determined UE combination and an Rx antenna beam for the Rx UE of the determined UE combination,
   wherein the reference information includes beam information including Tx antenna beam identification information indicating a Tx antenna beam that is requested by the at least one Tx UE and an Rx antenna beam identification information indicating an Rx antenna beam that is requested by the at least one Rx UE, and
   wherein determining the UE combination comprises:
   acquiring an included angle at each of combinations of the Tx antenna beam indicated by the Tx antenna beam identification information and the Rx antenna beam indicated by the Rx antenna beam identification information, and acquiring a combination that is capable of sharing the resource based on the included angle at each of the combinations.

2. The method of claim 1, wherein the determined UE combination which is capable of sharing the resource includes a combination for which an included angle is maximum among combinations.

3. The method of claim 1, wherein the determined UE combination which is capable of sharing the resource includes a combination for which an included angle is greater than a preset threshold value among the combinations.

4. The method of claim 1, wherein the acquiring the combination comprises selecting one combination based on received signal strength in an Rx UE from among combinations in which at least one of a Tx UE and an Rx UE is overlapped if there are a plurality of included angles greater than a preset threshold value among included angles of the combinations and there are the combinations in which the at least one of the Tx UE and the Rx UE is overlapped.

5. The method of claim 3, wherein the UE combination is determined by selecting one combination for which remaining self-interference is minimum from among combinations in which at least one of a Tx UE and an Rx UE is overlapped if there are the combinations in which the at least one of the Tx UE and the Rx UE is overlapped among combinations for which included angles are greater than a preset threshold value among included angles of the combinations.

6. A base station (BS) in a wireless communication system supporting a full-duplex scheme, the BS comprising:
a controller configured to:
acquire reference information for allocating a resource;
determine, based on the acquired reference information, a user equipment (UE) combination of a transmission (Tx) UE and a reception (Rx) UE which is capable of sharing a resource from combinations of at least one Tx UE and at least one Rx UE; and
allocate a Tx antenna beam for the Tx UE of the determined UE combination and an Rx antenna beam for the Rx UE of the determined UE combination, wherein the reference information includes beam information including Tx antenna beam identification information indicating a Tx antenna beam that is requested by the at least one Tx UE and an Rx antenna beam identification information indicating an Rx antenna beam that is requested by the at least one Rx UE, and
wherein the controller is configured to:
acquire an included angle at each of combinations of the Tx antenna beam indicated by the Tx antenna beam identification information and the Rx antenna beam indicated by the Rx antenna beam identification information; and
acquire a combination which is capable of sharing the resource based on the included angle at each of the combinations.

7. The BS of claim 6, wherein the determined UE combination which is capable of sharing the resource includes a combination for which an included angle is maximum among the combinations.

8. The BS of claim 6, wherein the determined UE combination which is capable of sharing the resource includes a combination for which an included angle is greater than a preset threshold value among the combinations.

9. The BS of claim 6, wherein the controller is configured to select one combination based on received signal strength in an Rx UE from among combinations in which at least one of a Tx UE and an Rx UE is overlapped if there are a plurality of included angles greater than a preset threshold value among included angles of the combinations and there are the combinations in which the at least one of the Tx UE and the Rx UE is overlapped.

10. The BS of claim 8, wherein the controller is configured to select one combination for which remaining self-interference is minimum from among combinations in which at least one of a Tx UE and an Rx UE is overlapped if there are the combinations in which the at least one of the Tx UE and the Rx UE is overlapped among combinations for which included angles are greater than a preset threshold value among included angles of the combinations.

* * * * *